United States Patent
Xu et al.

(10) Patent No.: US 11,864,144 B2
(45) Date of Patent: Jan. 2, 2024

(54) WIRELESS COMMUNICATION METHOD AND APPARATUS FOR ASYNCHRONOUSLY SENDING UPLINK DATA

(71) Applicant: HUAWEI TECHNOLOGIES CO., LTD., Guangdong (CN)

(72) Inventors: Xiaoying Xu, Shanghai (CN); Yi Wang, Shanghai (CN); Qufang Huang, Shenzhen (CN); Xing Liu, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 399 days.

(21) Appl. No.: 17/169,050

(22) Filed: Feb. 5, 2021

(65) Prior Publication Data
US 2021/0160805 A1 May 27, 2021

Related U.S. Application Data

(63) Continuation of application No. PCT/CN2019/099270, filed on Aug. 5, 2019.

(30) Foreign Application Priority Data

Aug. 9, 2018 (CN) .......................... 201810904668.7

(51) Int. Cl.
*H04W 56/00* (2009.01)
*H04L 1/1812* (2023.01)
(52) U.S. Cl.
CPC ....... *H04W 56/0045* (2013.01); *H04L 1/1819* (2013.01); *H04W 56/001* (2013.01)

(58) Field of Classification Search
None
See application file for complete search history.

(56) References Cited

U.S. PATENT DOCUMENTS

| 2015/0223184 A1* | 8/2015 | Bergstrom ........ H04W 56/0045 370/329 |
| 2016/0345316 A1 | 11/2016 | Kazmi et al. |

(Continued)

FOREIGN PATENT DOCUMENTS

| CN | 102763468 A | 10/2012 |
| CN | 103069896 A | 4/2013 |

(Continued)

OTHER PUBLICATIONS

Extended European Search Report issued in European Application No. 19847627.7 dated Sep. 20, 2021, 10 pages.

(Continued)

*Primary Examiner* — Saad Khawar
(74) *Attorney, Agent, or Firm* — Fish & Richardson P.C.

(57) ABSTRACT

The present disclosure relates to wireless communication methods, terminal devices, and network devices. In one example method, a network device sends timing advance timer (TAT) configuration information to a terminal device, where the TAT configuration information is used by the terminal device to configure duration of a TAT. The terminal device receives the TAT configuration information sent by the network device. The terminal device configures the TAT based on the TAT configuration information, and asynchronously sends uplink data to the network de vice based on a running status of the TAT. The network device receives the uplink data sent by the terminal device based on the TAT configuration information.

14 Claims, 6 Drawing Sheets

(56) References Cited

U.S. PATENT DOCUMENTS

| | | | |
|---|---|---|---|
| 2017/0078058 A1 | 3/2017 | Marinier et al. | |
| 2017/0178058 A1 | 6/2017 | Bhat et al. | |
| 2018/0014263 A1* | 1/2018 | Dinan | H04L 69/22 |
| 2018/0084546 A1 | 3/2018 | Guo et al. | |
| 2019/0037629 A1* | 1/2019 | Ryu | H04W 76/27 |

FOREIGN PATENT DOCUMENTS

| | | |
|---|---|---|
| CN | 107409370 A | 11/2017 |
| CN | 107534995 A | 1/2018 |
| EP | 3668263 A1 | 6/2020 |
| EP | 3893569 A1 | 10/2021 |
| JP | 2018501712 A | 1/2018 |
| WO | 2017118097 A1 | 7/2017 |
| WO | 2018035802 A1 | 3/2018 |
| WO | WO-2018035802 A1 * | 3/2018 |
| WO | 2018060927 A1 | 4/2018 |
| WO | 2018133645 A1 | 7/2018 |

OTHER PUBLICATIONS

Office Action issued in Japanese Application No. 2021-506642 dated Mar. 7, 2022, 11 pages (with English translation).

Zte, "Discussion on the feasibility of mobility enhancement solutions," 3GPP TSG-RAN WG4 Meeting #80, R4-165585, Gothenburg, Sweden, Aug. 22-26, 2016, 3 pages.

Office Action in Chinese Application No. 201810904668.7, dated Jun. 28, 2020, 16 pages.

PCT International Search Report and Written Opinion in International Application No. PCT/CN2019/099270, dated Sep. 26, 2019, 17 pages.

Office Action in Japanese Appln. No. 2021-506642,15,2023, dated May 5 pages (with English translation).

EP Communication Pursuant to Article 94(3) EPC in European Appln No. 19847627.7, dated Jul. 25, 2023, 9 pages.

* cited by examiner

WIRELESS COMMUNICATION METHOD AND APPARATUS FOR ASYNCHRONOUSLY SENDING UPLINK DATA

CROSS-REFERENCE TO RELATED APPLICATIONS

This application is a continuation of International Application No. PCT/CN2019/099270, filed on Aug. 5, 2019, which claims priority to Chinese Patent Application No. 201810904668.7, filed on Aug. 9, 2018. The disclosures of the aforementioned applications are hereby incorporated by reference in their entireties.

TECHNICAL FIELD

This application relates to the communications field, and more specifically, to a wireless communication method and an apparatus.

BACKGROUND

In the prior art, a terminal device synchronously sends uplink data to a network device. The terminal device usually implements synchronous sending by using a timing advance timer (TAT). To be specific, the terminal device can synchronously send the uplink data to the network device only within a timing range of the TAT, and the terminal device stops sending the uplink data when the TAT expires. When the terminal device needs to send data, the terminal device needs to initiate a random access process to obtain a timing advance (TA) value, thereby resulting in a relatively long communication delay and affecting user experience.

SUMMARY

This application provides a wireless communication method and an apparatus, so that a terminal device can asynchronously send uplink data to a network device based on TAT configuration information, thereby reducing a communication delay and improving user experience.

According to a first aspect, a wireless communication method is provided, and the method is performed by a terminal device and includes: receiving timing advance timer TAT configuration information sent by a network device, where the TAT configuration information is used to configure duration of a TAT; configuring the TAT based on the TAT configuration information; and asynchronously sending uplink data based on a running status of the TAT.

Therefore, the network device sends, to the terminal device, the TAT configuration information used to configure the duration of the TAT, and the terminal device configures the TAT based on the configuration information, and asynchronously sends the uplink data based on the running status of the TAT, so that the terminal device transmits the uplink data to the network device in an asynchronous sending manner.

With reference to the first aspect, in some implementations of the first aspect, the TAT configuration information includes a first TAT, and the first TAT is used to control an effective time of an uplink timing advance for synchronous sending.

With reference to the first aspect, in some implementations of the first aspect, the asynchronously sending uplink data based on a running status of the TAT includes: asynchronously sending the uplink data when the first TAT expires.

With reference to the first aspect, in some implementations of the first aspect, the terminal device synchronously sends the uplink data when the first TAT does not expire.

In this case, the terminal device synchronously sends the uplink data when the first TAT runs, or in other words, when the first TAT does not expire; or the terminal device asynchronously sends the uplink data when the first TAT expires, so that the terminal device cannot only synchronously send the uplink data to the network device, but also transmit the uplink data to the network device in an asynchronous sending manner.

With reference to the first aspect, in some implementations of the first aspect, the TAT configuration information may be a message such as a system information block (SIB), an RRC reconfiguration message, an RRC connection establishment message, an RRC connection re-establishment message, a connection resume message, a connection release message, or a connection suspend message.

With reference to the first aspect, in some implementations of the first aspect, the TAT configuration information further includes one or more types of the following information:

resource information used to asynchronously send the uplink data, hybrid automatic repeat request HARQ process information used to asynchronously send the uplink data, resource information used to synchronously send the uplink data, and HARQ process information used to synchronously send the uplink data.

With reference to the first aspect, in some implementations of the first aspect, when the first TAT expires, the terminal device may clear data in a hybrid automatic repeat request HARQ process used to synchronously send the uplink data and a resource used to synchronously send the uplink data, and enable asynchronous sending for initial transmission or retransmission; or when the first TAT expires, the terminal device may not clear data in a hybrid automatic repeat request HARQ process used to synchronously send the uplink data, and asynchronously send the data buffered in the HARQ process.

With reference to the first aspect, in some implementations of the first aspect, when the first TAT expires, the terminal device may asynchronously send the uplink data by using a TA value obtained when the first TAT expires or by using TA=0.

With reference to the first aspect, in some implementations of the first aspect, the TAT configuration information includes a second TAT, and the second TAT is used to control an effective time of an uplink timing advance for asynchronous sending.

With reference to the first aspect, in some implementations of the first aspect, the asynchronously sending uplink data based on a running status of the TAT includes: asynchronously sending the uplink data when the second TAT runs.

In this case, the terminal device asynchronously sends the uplink data when the second TAT runs, so that the terminal device transmits the uplink data to the network device in an asynchronous sending manner.

With reference to the first aspect, in some implementations of the first aspect, the TAT configuration information further includes one or more types of the following information: resource information used to asynchronously send the uplink data and hybrid automatic repeat request HARQ process information used to asynchronously send the uplink data.

With reference to the first aspect, in some implementations of the first aspect, when the second TAT expires, the terminal device stops sending the uplink data, and clears data in a hybrid automatic repeat request HARQ process used to asynchronously send the uplink data and a resource used to asynchronously send the uplink data.

With reference to the first aspect, in some implementations of the first aspect, when the second TAT runs, the terminal device may asynchronously send the uplink data by using TA=0.

With reference to the first aspect, in some implementations of the first aspect, the TAT configuration information includes a first TAT and a second TAT, the first TAT is used to control an effective time of an uplink timing advance for synchronous sending, and the second TAT is used to control an effective time of an uplink timing advance for asynchronous sending.

With reference to the first aspect, in some implementations of the first aspect, the uplink data is synchronously sent when the first TAT runs; or the uplink data is asynchronously sent when the first TAT does not run and the second TAT runs; or sending of the uplink data is stopped when neither the first TAT nor the second TAT runs.

In this case, the terminal device synchronously sends the uplink data when the first TAT runs, or in other words, when the first TAT does not expire; or the terminal device asynchronously sends the uplink data when the first TAT does not run and the second TAT runs, so that the terminal device cannot only synchronously send the uplink data to the network device, but also transmit the uplink data to the network device in an asynchronous sending manner.

With reference to the first aspect, in some implementations of the first aspect, the TAT configuration information further includes one or more types of the following information:

resource information used to asynchronously send the uplink data, hybrid automatic repeat request HARQ process information used to asynchronously send the uplink data, resource information used to synchronously send the uplink data, and HARQ process information used to synchronously send the uplink data.

Optionally, when the first TAT expires, the terminal device stops synchronously sending the uplink data, and the terminal device may clear data in a hybrid automatic repeat request HARQ process used to synchronously send the uplink data and a resource used to synchronously send the uplink data, and enable asynchronous sending for initial transmission or retransmission; or when the first TAT expires, the terminal device may not clear data in a hybrid automatic repeat request HARQ process used to synchronously send the uplink data, and asynchronously send the data buffered in the HARQ.

With reference to the first aspect, in some implementations of the first aspect, the method further includes: when a maximum TA difference of the terminal device is greater than or equal to a first threshold and is less than or equal to a second threshold, determining that a TAT of a TAG in which a secondary cell is located expires, and asynchronously sending the uplink data to the secondary cell, where the maximum TA difference is a maximum difference between TAs of any two of TAGs of the terminal; or when a maximum TA difference of the terminal device is greater than a third threshold, determining that a TAT of a TAG in which a secondary cell is located expires, and asynchronously sending the uplink data to the secondary cell, where the maximum TA difference is a maximum difference between TAs of any two of TAGs of the terminal.

With reference to the first aspect, in some implementations of the first aspect, if a first TAT of a primary timing advance group PTAG of the terminal device expires, for all serving cells of the terminal device, data, buffered in a HARQ process for non-asynchronous sending is cleared, and a resource for non-asynchronously sending the uplink data is deleted.

With reference to the first aspect, in some implementations of the first aspect, if a first TAT of a secondary timing advance group STAG of the terminal device expires, for a serving cell that belongs to the STAG of the terminal device, data buffered in a HARQ process for non-asynchronous sending is cleared, and a resource for non-asynchronously sending the uplink data is deleted.

With reference to the first aspect, in some implementations of the first aspect, the method further includes: when the terminal device reselects a target ceil in place of a source cell, stopping the first TAT or the second TAT running on the terminal, where the first TAT or the second TAT is started in the source cell.

With reference to the first aspect, in some implementations of the first aspect, the method further includes: when the terminal device reselects the target cell in place of the source cell, and the source cell and the target cell belong to a same TAT group, determining to use a TAT of the source cell in the target cell.

With reference to the first aspect, in some implementations of the first aspect, the method further includes: asynchronously sending the uplink data when the first TAT expires or does not run, where the first TAT is started in the source cell; or asynchronously sending the uplink data when the second TAT runs, where the second TAT is started in the source cell.

With reference to the first aspect, m some implementations of the first aspect, when a TA sent by a network device of the target cell is received, the second TAT is stopped, and a third TAT of the target cell is started, where the third TAT is used to control an effective time of an uplink timing advance for asynchronous sending; and the uplink data is asynchronously sent when the third TAT of the target cell runs.

With reference to the first aspect, in some implementations of the first aspect, that a second TAX of the source cell does not expire when the terminal device reselects the target cell in place of the source cell includes: when tinting duration of the second TAT of the source cell is less than timing duration of a fourth TAT of the target cell, determining that the second TAT of the source cell does not expire; or when timing duration of a fourth TAT of the target cell is greater than a current timing value of the second TAT of the source cell, determining that the second TAT of the source cell does not expire.

With reference to the first aspect, in some implementations of the first aspect, the source ceil in which the terminal device is located may indicate a downlink timing offset difference from the target cell. After the terminal device reselects the target cell, a TA value of the target cell is determined based on a TA value maintained by the source cell and the downlink timing offset difference, and the TA value of the target cell may be used during synchronous or asynchronous sending.

With reference to the first aspect, in some implementations of the first aspect, the terminal device may further determine the timing duration of the second TAT in a manner agreed upon in a protocol.

With reference to the first aspect, in some implementations of the first aspect, the receiving TAT configuration information includes: receiving a broadcast message, where the broadcast message includes the TAT configuration information, and the TAT configuration information includes a first TAT and a second TAT. The method further includes: The terminal device determines, based on a capability of the terminal device, timing duration for using the first TAT or the second TAT.

With reference to the first aspect, in some implementations of the first aspect, the method further includes: The terminal device receives indication information used for synchronous or asynchronous sending from a handover command or a connection reconfiguration message, and determines a manner of sending the uplink data.

With reference to the first aspect, in some implementations of the first aspect, the method further includes: The terminal device determines a downlink transmission delay based on a sending time that is of downlink data and that is indicated by the network device and a receiving time of receiving the downlink data by the terminal device; and determines an uplink timing advance TA based on the downlink transmission delay.

In this case, the terminal device determines the downlink transmission delay based on the sending time that is of the downlink data and that is indicated by the network device and the receiving time of receiving the downlink data by the terminal device, and determines the uplink timing advance TA based on the downlink transmission delay. The terminal device may estimate a TA based on a transmission delay, and adjust the TA without entirely relying on the network device, thereby improving accuracy of controlling uplink sending timing of the terminal device within a CP range as much as possible, and reducing detection complexity of the network device.

With reference to the first aspect, in some implementations of the first aspect, the method further includes: The terminal device adjusts uplink sending timing based on the determined uplink timing advance, and synchronously sends the uplink data to the network device; or asynchronously sends the uplink data when the uplink timing advance exceeds a predefined threshold; or synchronously sends the uplink data when the uplink timing advance does not exceed a predefined threshold.

According to a second aspect, a wireless communication method is provided, and the method is performed by a network device and includes: sending timing advance timer TAT configuration information to a terminal device, where the TAT configuration information is used by the terminal device to configure duration of a TAT; and receiving uplink data sent by the terminal device based on a running status of the TAT With reference to the second aspect, in some implementations of the second aspect, the configuration information includes:

a first TAT, where the first TAT is used to control an effective time of an uplink timing advance for synchronous sending;

a second TAT, where the second TAT is used to control an effective time of an uplink timing advance for asynchronous sending; or a first TAT and a second TAT, where the first TAT is used to control an effective time of an uplink timing advance for synchronous sending, and the second TAT is used to control an effective time of an uplink timing advance for asynchronous sending.

With reference to the second aspect, in some implementations of the second aspect, the configuration information further includes one or more types of the following information: a resource used to asynchronously send the uplink data, HARQ process information used to asynchronously send the uplink data, a resource used to synchronously send the uplink data, and HARQ process information used to synchronously send the uplink data.

According to a third aspect, a wireless communication method is provided, and the method is performed by a terminal device and includes:

when a maximum TA difference of the terminal device is greater than or equal to a first threshold and is less than or equal to a second threshold, determining that a TAT of a TAG in which a secondary cell is located expires, and asynchronously sending uplink data to the secondary cell, where the maximum TA difference is a maximum difference between TAs of any two of TAGs of the terminal device; or when a maximum TA difference of the terminal device is greater than a third threshold, determining that a TAT of a TAG in which a secondary cell is located expires, and asynchronously sending uplink data to the secondary cell, where the maximum TA difference is a maximum difference between TAs of any two of TAGs of the terminal device.

Therefore, in this embodiment of this application, when the maximum TA difference of the terminal device is greater than or equal to the first threshold and less than or equal to the second threshold, or when the maximum TA difference of the terminal device is greater than the third threshold, it is determined that the TAT of the TAG in which the secondary cell is located expires, and the uplink data is asynchronously sent to the secondary cell, so that the terminal device asynchronously sends the uplink data.

With reference to the third aspect, in some implementations of the third aspect, when determining that the TAT of the TAG in which the secondary cell is located expires, the terminal device stops synchronously sending the uplink data to the secondary cell, and the terminal device may clear data in a hybrid automatic repeat request HARQ process used to synchronously send the uplink data and a resource used to synchronously send the uplink data, and enable asynchronous sending for initial transmission or retransmission; or when determining that the TAT of the TAG in which the secondary cell is located expires, the terminal device may not clear data in a hybrid automatic repeat request HARQ process used to synchronously send the uplink data, and asynchronously send the data buffered in the HARQ.

With reference to the third aspect, in some implementations of the third aspect, the first threshold, the second threshold, and the third threshold may be agreed upon in a protocol or may be configured by the network device.

In the following aspects, a communications apparatus is provided, including units or means configured to perform the steps of any one of the foregoing methods.

According to a fourth aspect, a communications apparatus is provided, including:

a receiving unit, configured to receive timing advance timer TAT configuration information sent by a network device, where the TAT configuration information is used to configure duration of a TAT;

a configuration unit, configured to configure the TAT based on the TAT configuration information; and a sending unit, configured to asynchronously send uplink data based on a running status of the TAT.

With reference to the fourth aspect, in some implementations of the fourth aspect, the TAT configuration information includes a first TAT, and the first TAT is used to control an effective time of an uplink timing advance for synchronous sending.

With reference to the fourth aspect, in some implementations of the fourth aspect, the sending unit is specifically configured to asynchronously send the uplink data when the first TAT expires.

With reference to the fourth aspect, in some implementations of the fourth aspect, the TAT configuration information further includes one or more types of the following information: resource information used to asynchronously send the uplink data, hybrid automatic repeat request HARQ process information used to asynchronously send the uplink data, resource information used to synchronously send the uplink data, and HARQ process information used to synchronously send the uplink data.

With reference to the fourth aspect, in some implementations of the fourth aspect, the TAT configuration information includes a second TAT, and the second TAT is used to control an effective time of an uplink timing advance for asynchronous sending.

With reference to the fourth aspect, in some implementations of the fourth aspect, the sending unit is specifically configured to asynchronously send the uplink data when the second TAT runs.

With reference to the fourth aspect, in some implementations of the fourth aspect, the TAT configuration information further includes one or more types of the following information: resource information used to asynchronously send the uplink data and hybrid automatic repeat request HARQ process information used to asynchronously send the uplink data.

With reference to the fourth aspect, in some implementations of the fourth aspect, the TAT configuration information includes a first TAT and a second TAT, the first TAT is used to control an effective time of an uplink timing advance for synchronous sending, and the second TAT is used to control an effective time of an uplink timing advance for asynchronous sending.

With reference to the fourth aspect, in some implementations of the fourth aspect, the sending unit is specifically configured to asynchronously send the uplink data when the first TAT does not run and the second TAT runs.

With reference to the fourth aspect, in some implementations of the fourth aspect, the configuration information further includes one or more types of the following information: resource information used to asynchronously send the uplink data, hybrid automatic repeat request HARQ process information used to asynchronously send the uplink data, resource information used to synchronously send the uplink data, and HARQ process information used to synchronously send the uplink data.

With reference to the fourth aspect, in some implementations of the fourth aspect, the sending unit is further configured to:

when a maximum TA difference of the terminal device is greater than or equal to a first threshold and is less than or equal to a second threshold, determine that a TAT of a TAG in which a secondary cell is located expires, and asynchronously send the uplink data to the secondary cell, where the maximum TA difference is a maximum difference between TAs of any two of TAGs of the terminal; or when a maximum TA difference of the terminal device is greater than a third threshold, determine that a TAT of a TAG in which a secondary cell is located expires, and asynchronously send the uplink data, to the secondary cell, where the maximum TA difference is a maximum difference between TAs of any two of TAGs of the terminal.

With reference to the fourth aspect, in some implementations of the fourth aspect, the terminal device further includes a processing unit. The processing unit is configured to: when the terminal device reselects a target cell in place of a source cell, stop the first TAT or the second TAT running on the terminal, where the first TAT or the second TAT is started in the source cell.

With reference to the fourth aspect, in some implementations of the fourth aspect, the terminal device further includes a processing unit. The processing unit is configured to: when the terminal device reselects a target cell in place of a source ceil, and the source ceil and the target ceil belong to a same TAT group, determine to use a TAT of the source cell in the target ceil.

With reference to the fourth aspect, in some implementations of the fourth aspect, the sending unit is further configured to: asynchronously send the uplink data when the first TAT expires or does not run, where the first TAT is started in the source cell; or asynchronously send the uplink data when the second TAT runs, where the second TAT is started in the source cell.

With reference to the fourth aspect, in some implementations of the fourth aspect, the receiving unit is further configured to receive a broadcast message, where the broadcast message includes the TAT configuration information, and the TAT configuration information includes a first TAT and a second TAT.

The terminal device further includes a processing unit, and the processing unit is configured to determine, based on a capability of the terminal device, timing duration for using the first TAT or the second TAT.

According to a fifth aspect, a communications apparatus is provided, including:

a sending unit, configured to send timing advance timer TAT configuration information to a terminal device, where the TAT configuration information is used by the terminal device to configure duration of a TAT; and a receiving unit, configured to receive uplink data sent by the terminal device.

With reference to the fifth aspect, in some implementations of the fifth aspect, the configuration information includes:

a first TAT, where the first TAT is used to control an effective time of an uplink timing advance for synchronous sending;

a second TAT, where the second TAT is used to control an effective time of an uplink timing advance for asynchronous sending; or a first TAT and a second TAT, where the first TAT is used to control an effective time of an uplink timing advance for synchronous sending, and the second TAT is used to control an effective time of an uplink timing advance for asynchronous sending.

With reference to the fifth aspect, in some implementations of the fifth aspect, the configuration information further includes one or more types of the following information: a resource used to asynchronously send the uplink data, HARQ process information used to asynchronously send the uplink data, a resource used to synchronously send the uplink data, and HARQ process information used to synchronously send the uplink data.

According to a sixth aspect, a communications apparatus is provided, including:

a determining unit, configured to: when a maximum TA difference of the terminal device is greater than or equal to a first threshold and is less than or equal to a second threshold, determine that a TAT of a TAG in which a secondary cell is located expires, and asynchronously send uplink data to the secondary cell, where the maximum TA difference is a maximum difference between TAs of any two of TAGs of the terminal device; or when a maximum TA difference of the terminal device is greater than a third threshold, determine that a TAT of a TAG in which a secondary ceil is located expires, and asynchronously send uplink data to the secondary cell, where the maximum TA difference is a maximum difference between TAs of any two of TAGs of the terminal device.

According to a seventh aspect, this application provides a communications apparatus, including at least one processor, configured to: be connected to a memory, and invoke a program stored in the memory, to perform the method in any one of the first aspect and the optional implementations of the first aspect and any one of the third aspect and the optional implementations of the third aspect. The program is directly or indirectly executed by the at least one processor, so that the communications apparatus can be enabled to perform the method in any one of the first aspect and the optional implementations of the first aspect and any one of the third aspect and the optional implementations of the third aspect.

According to an eighth aspect, a communications apparatus is provided, including at least one processor and an interface circuit. The interface circuit is used by the communications apparatus to communicate with another device, and a stored instruction is directly or indirectly executed by the at least one processor, so that the communications apparatus can be enabled to perform the method in any one of the first aspect and the optional implementations of the first aspect and any one of the third aspect and the optional implementations of the third aspect.

According to a ninth aspect, a terminal is provided. The terminal includes the apparatus provided in the fourth aspect, or the terminal includes the apparatus provided in the sixth aspect, or the terminal includes the apparatus provided in the seventh aspect, or the terminal includes the apparatus provided in the eighth aspect.

According to a tenth aspect, this application provides a program. Mien being executed by a processor, the program is used to perform the method provided in the first aspect or the third aspect.

According to an eleventh aspect, tins application provides a program product, for example, a computer readable storage medium, including the program in the tenth aspect.

According to a twelfth aspect, this application provides a communications apparatus-including at least one processor, configured to: be connected to a memory, and invoke a program stored in the memory, to perform the method in any one of the second aspect and the optional implementations of the second aspect. The program is directly or indirectly executed by the at least one processor, so that the communications apparatus can be enabled to perform the method in any one of the second aspect and the optional implementations of the second aspect.

According to a thirteenth aspect, a communications apparatus is provided, including at least one processor and an interface circuit. The interface circuit is used by the communications apparatus to communicate with another device, and a stored instruction is directly or indirectly executed by the at least one processor, so that the communications apparatus can be enabled to perform the method in any one of the second aspect and the optional implementations of the second aspect.

According to a fourteenth aspect, a terminal is provided. The terminal includes the apparatus provided in the fifth aspect, or the terminal includes the apparatus provided in the twelfth aspect, or the terminal includes the apparatus provided in the thirteenth aspect.

According to a fifteenth aspect, this application provides a program. When being executed by a processor, the program is used to perform the method provided in the second aspect.

According to a sixteenth aspect, this application provides a program product, for example, a computer readable storage medium, including the program in the fifteenth aspect.

DESCRIPTION OF EMBODIMENTS

Figure 1:
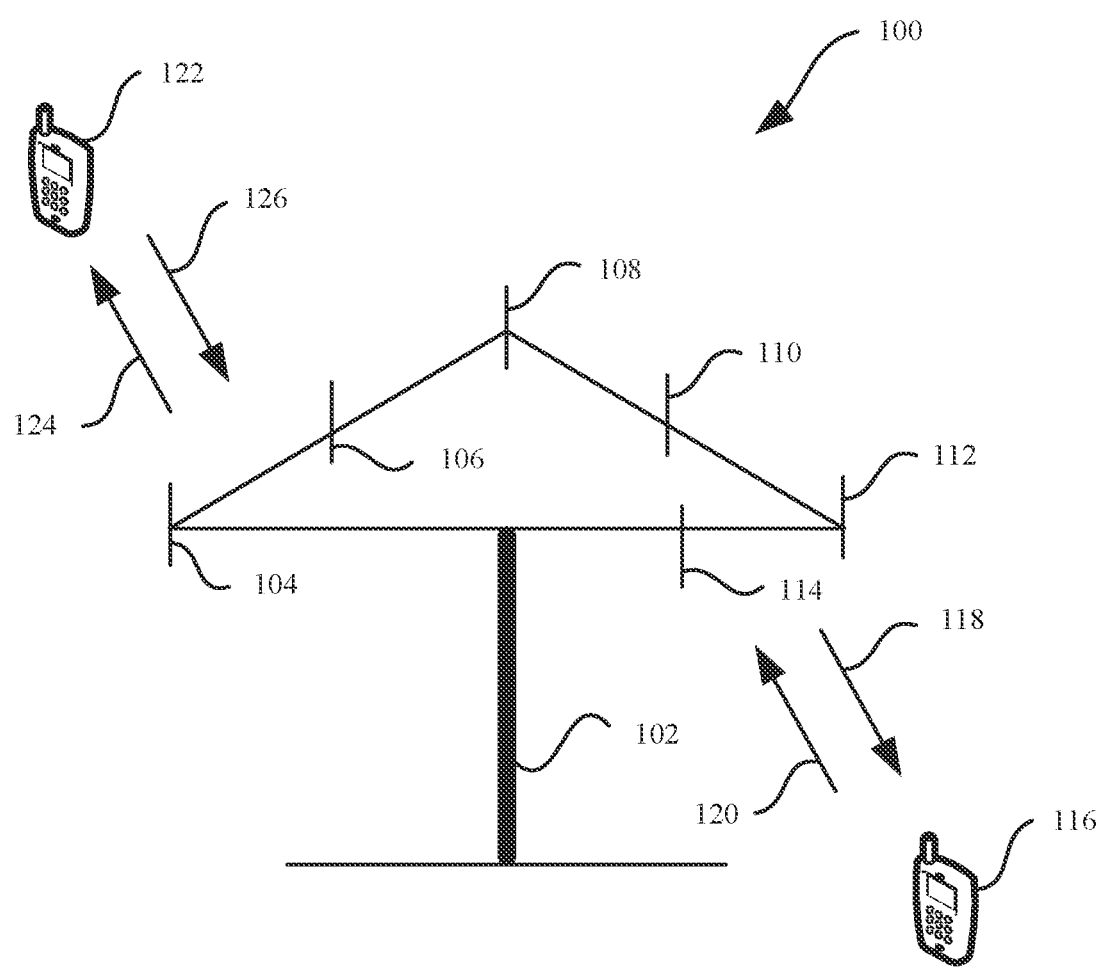
FIG. 1 is a schematic diagram of a communications system according to an embodiment of this application.

The following describes technical solutions of this application with reference to accompanying drawings.

To facilitate understanding of the embodiments of this application, terms used in this application are first explained.

In this application, synchronous sending may also be referred to as orthogonal multiple access. The synchronous sending may mean that data and a relatively short sequence code are sent together on a data resource. For example, in the synchronous sending, a first demodulation reference signal (DMRS) and data may be transmitted together on a PUSCH resource. The first DMRS may be an existing DMRS format, or may be a newly introduced DMRS sequence. Asynchronous sending may also be referred to as non-orthogonal multiple access, or may also be referred to as 2-step random access channel (RACH) sending. The asynchronous sending means that a preamble and data are simultaneously sent. In an example of the asynchronous sending, a terminal device first sends the preamble, and sends the data on a PUSCH resource before receiving a random access response. A first DMRS may be further sent in the asynchronous sending. The asynchronous sending means that the data is sent on a PUSCH, and the preamble is sent on a RACH resource or the PUSCH. It may be further understood that during the asynchronous sending, it may be considered that the terminal device sends the data when there is no valid TA value, that is, sends the data in a cell included in a TAG whose TAT expires. In the asynchronous sending, a relatively long sequence code may be used to accompany the data for uplink transmission. The relatively long sequence code may be a random access preamble or a relatively long DMRS, for example, a first preamble, a second DMRS, or a spreading code. Formats of the second DMRS and the first DMRS are different. For example, a sequence of the second DMRS is longer than that of the first DMRS. Optionally, the first Preamble and the data are sent on a data resource in a time division manner. Optionally, the first preamble and the data resource are sent in a frequency division manner. In other words, a frequency domain resource for sending the preamble is different from that for sending the data. Times of sending the first preamble and the data, may be separated or may be overlapped. When the spreading code is used, the terminal scrambles the sent data by using the spreading code, and then asynchronously sends the data.

In this application, one or more pieces of information in TAT configuration information sent by a network device to the terminal device may be configured by using radio resource control (RRC) signaling, media access control (MAC) signaling, physical layer signaling, or the like.

The technical solutions of the embodiments of this application may be applied to various communications systems, such as: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future $5^{th}$ generation (5G) system, or a new radio (NR) system.

The terminal device in the embodiments of this application may also be referred to as user equipment, an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a cellular phone, a cordless phone, a session initiation protocol (SIP) phone, a wireless local loop (WLL) station, a personal digital assistant (PDA), a hand-held device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

The network device in the embodiments of this application may be a device configured to communicate with the terminal device. The network device may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in an LIE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may include any one or more computer operating systems, for example, a Linux operating system, a Unix operating system, an Android operating system, an iOS operating system, or a Windows operating system, implementing service processing by using a process. The application layer includes applications such as a browser, an address book, word processing software, and instant messaging software. In addition, the embodiments of this application do not particularly limit a specific structure of an execution body of the method provided in the embodiments of this application, provided that a program recording code of the method provided in the embodiments of this application can be run to implement communication according to the method provided in the embodiments of this application. For example, the execution body of the method provided in the embodiments of this application may be the terminal device or the network device, or may be a function unit capable of invoking and executing a program in the terminal device or the network device.

In addition, aspects or features of this application may be implemented as a method, an apparatus or a product that uses standard programming and/or engineering technologies. The term "product" used in this application covers a computer program that can be accessed from any computer readable component, carrier or medium. For example, the computer readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of a communications system according to this application. As shown in FIG. 1, a communications system 100 includes a network device 102, and the network device 102 may include a plurality of antennas, such as an antenna 104, an antenna 106, an antenna. 108, an antenna. 110, an antenna 112, and an antenna 114. In addition, the network device 102 may additionally include a transmitter chain and a receiver chain. A person of ordinary skill in the art may understand that the transmitter chain and the receiver chain may include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or the terminal device 122.

As shown in FIG. 1, the terminal device 116 communicates with the antenna 112 and the antenna 114. The antenna 112 and the antenna 114 each send information to the terminal device 116 over a forward link 118, and receive information from the terminal device 116 over a reverse link 120. In addition, the terminal device 122 communicates with the antenna 104 and the antenna 106. The antenna. 104 and the antenna 106 each send information to the terminal device 122 over a forward link 124, and receive information from the terminal device 122 over a reverse link 126.

For example, in a frequency division duplex (FDD) system, for example, the forward link 118 and the reverse link 120 may use different frequency bands, and the forward link 124 and the reverse link 126 may use different frequency bands.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or area designed for communication are/is referred to as a sector of the network device 102. For example, the antenna group may be designed to communicate with a terminal device in a sector of coverage of the network device 102. In a process in which the network device 102 communicates with the terminal device 116 and the terminal device 122 over the forward link 118 and the forward link 124 respectively, a transmit antenna of the network device 102 can improve signal-to-noise ratios of the forward link 118 and the forward link 124 through beamforming. In addition, when the network device 102 sends, through beamforming, signals to the terminal device 116 and the terminal device 122 that are randomly scattered in related coverage, interference to a mobile device in a neighboring cell is less than that caused when a network device sends signals to all terminal devices of the network device by using a single antenna.

Within a given time, the network device 102, the terminal device 116, or the terminal device 122 may be a wireless communication sending apparatus and/or a wireless communication receiving apparatus. When sending data, the wireless communication sending apparatus may encode the data for transmission. Specifically, the wireless communications sending apparatus may obtain (for example, generate, receive from another communications apparatus, or store in a memory) a particular quantity of data bits to be sent to the wireless communications receiving apparatus through a channel. The data bits may be included in a transport block (or a plurality of transport blocks) of the data, and the transport block may be segmented into a plurality of code blocks.

In addition, FIG. 1 is a simplified schematic diagram of an example. The network may further include another network device that is not shown in FIG. 1.

Sending of data by a terminal device to a network device is usually referred to as uplink transmission. An important feature of the uplink transmission is that different terminal devices perform orthogonal multiple access on time and frequency resources, that is, uplink transmission of different terminal devices in a same cell does not interfere with each other.

To ensure orthogonality of the uplink transmission and avoid intra-cell interference, the network device requires that times at which signals from different terminal devices in a same subframe but on different frequency domain resources arrive at the network device are basically aligned. The network device can correctly decode uplink data sent by the terminal device provided that the uplink data is received within a cyclic prefix range. Therefore, the orthogonal multiple access may also be referred to as synchronous transmission, and uplink synchronization requires that the times at which the signals from the different terminal devices in the same subframe arrive at the network device fall within the cyclic prefix range.

To ensure time synchronization on the network device side, LTE proposes an uplink timing advance mechanism.

From a perspective of the terminal device side, timing advance is essentially an offset between a start time of receiving a downlink subframe and a time of transmitting an uplink subframe. The network device may control, by properly controlling an uplink timing offset of each terminal device, the times at which the uplink signals from the different terminal devices arrive at the network device. Because a terminal device far away from the network device has a relatively large transmission delay, the terminal device needs to send uplink data earlier than a terminal device near the network device.

When transmitting uplink data (non-preamble), the terminal device first determines whether the terminal device has a "valid TA value". If yes, the terminal device uses the valid TA value to transmit the uplink data on a resource allocated by the network device. If no, the uplink data is not transmitted. If the terminal device needs to transmit a preamble, regardless of whether the terminal device has a "valid TA value", it is assumed that a TA is equal to 0 and the terminal device transmits the preamble.

In the prior art, the terminal device usually implements synchronous sending by using a timing advance timer (TAT). To be specific, synchronous sending can be performed only within a timing range of a TAT, and uplink sending stops if the TAT expires. In other words, being within the timing range of the TAT indicates that the terminal device has a "valid TA value", and the terminal device may transmit the uplink data on the resource allocated by the network device. When the TAT timing expires, it indicates that the terminal device has no "valid TA value", and the terminal device stops sending the uplink data, but may send the preamble.

It may be learned that in the prior art, when the terminal device needs to send data, the terminal device needs to initiate a random access process to obtain a timing advance (TA) value, thereby resulting in a relatively long communication delay and affecting user experience. Therefore, non-orthogonal multiple access may be introduced in uplink transmission. To be specific, the uplink transmission can support asynchronous sending. The asynchronous sending mainly means that the times at which the signals from the different terminal devices in the same subframe arrive at the network device may have a specific deviation, and do not need to fall with the cyclic prefix range. However, if an existing mechanism is still used, the terminal device cannot determine whether the terminal device can support the asynchronous sending and how to support the asynchronous sending in the case of a looser timing offset.

Based on the foregoing problem, this application provides a wireless communication method, so that a terminal device can determine a manner of sending uplink data, and the terminal device transmits the uplink data based on the determined manner of sending the uplink data. The sending manner includes asynchronous sending and synchronous sending.

Figure 2:
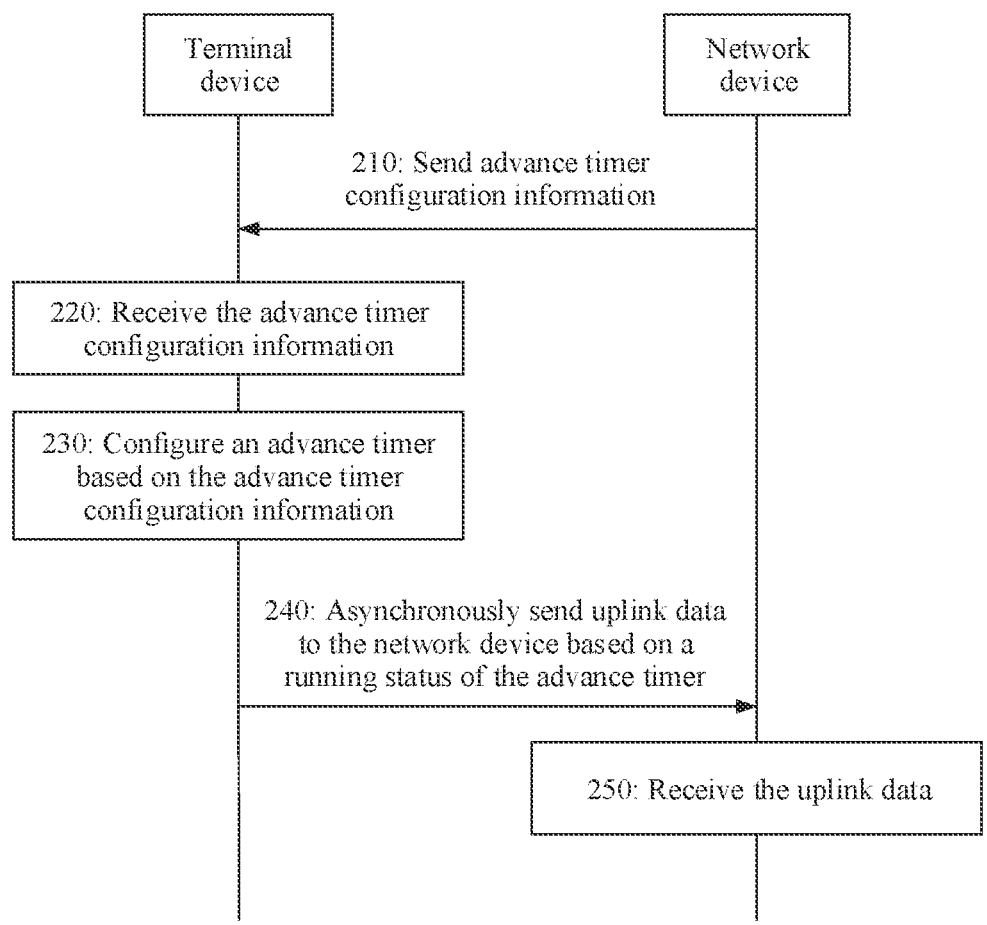
FIG. 2 is a schematic flowchart of a wireless communication method according to an embodiment of this application.

With reference to FIG. 2, the following describes in detail a wireless communication method 200 provided in this application. FIG. 2 is a schematic flowchart of a wireless communication method 200 according to an embodiment of this application. The method 200 may be applied to the scenario shown in FIG. 1, and certainly may also be applied to another communication scenario. This is not limited in this embodiment of this application.

In step 210, a network device sends timing advance timer TAT configuration information to a terminal device, where the TAT configuration information is used by the terminal device to configure duration of a TAT.

In step 220, the terminal device receives the TAT configuration information sent by the network device.

In step 230, the terminal device configures the TAT based on the TAT configuration information.

In step 240, the terminal device sends uplink data based on a running status of the TAT.

For example, the uplink data is synchronously sent to the network device, or the uplink data is asynchronously sent to the network device.

In step 250, the network device receives the uplink data sent by the terminal device.

Therefore, the network device sends, to the terminal device, the TAT configuration information used to configure the duration of the TAT, and the terminal device configures the TAT based on the configuration information, and asynchronously sends the uplink data to the network de vice based on the running status of the TAT, so that the terminal de vice transmits the uplink data to the network device in an asynchronous sending manner.

Optionally, the TAT configuration information includes a first TAT, and the first TAT is used to control an effective time of an uplink liming advance for synchronous sending.

Optionally, when the TAT configuration information includes the first TAT, the first TAT is started or restarted when the terminal device receives a timing advance TA sent by the network device. In step 240, the terminal device asynchronously sends the uplink data when the first TAT expires; or the terminal device synchronously sends the uplink data when the first TAT does not expire.

In this case, the terminal device synchronously sends the uplink data when the first TAT runs, or in other words, when the first TAT does not expire; or the terminal device asynchronously sends the uplink data when the first TAT expires, so that the terminal device cannot only synchronously send the uplink data to the network device, but also transmit the uplink data to the network device in an asynchronous sending manner.

It should be understood that, the TA is for a cell or a cell in a TAG, and when the terminal receives the TA, a first TAT associated with a TAG corresponding to a TA command is started or restarted. For a TA in a random access response, the TAG is a TAG in which a cell in winch the terminal device sends a preamble is located. A TA in a MAC instruction corresponds to a TAG indicated in the instruction.

It should be understood that the network device sends the timing advance TA to the terminal device in two manners. In one manner, in a random access process, the network device determines a timing advance value by measuring a received preamble, and sends the timing advance value to the terminal device by using a timing advance command field (12 bits in total) of a random access response (RAR). In another manner, in a radio resource control (RRC) connected mode, the network device sends the timing advance TA to the terminal device by using a timing advance command MAC control element or an RRC message. In the RRC connected mode, the network device needs to maintain timing advance information. Although uplink synchronization is implemented between the terminal device and the network device in the random access process, a time at which an uplink signal arrives at the network device may change over time. A transmission delay between a terminal device in high-speed movement, for example, a terminal device on an operating high-speed railway, and the network device continuously changes. A current transmission path disappears, and is switched to a new transmission path. For example, in a densely built city, this situation is likely to happen when people walk to a corner of a building. Due to a Doppler shift caused by movement of the terminal device, there is a crystal oscillator offset of the terminal device, and an error may occur in uplink timing if the offset is accumulated for a long time. Therefore, the terminal device needs to continuously update an uplink timing advance of the terminal device, to maintain uplink synchronization. The network device determines a timing advance value of each terminal device based on measurement of uplink transmission of a corresponding terminal device. Therefore, the network device may estimate the timing advance value provided that the terminal device performs uplink transmission. Theoretically, any signal (for example, a channel sounding reference signal (SRS)/DMRS/acknowledgment frame ACK/negative acknowledgment frame NACK/physical uplink shared channel (PUSCH)) sent by the terminal device may be used to measure a tuning advance. If a specific terminal device needs to be corrected, the network device sends a timing advance command to the terminal device by using a timing advance command MAC control element, to request the terminal device to adjust uplink transmission timing.

Optionally, the configuration message may be a message such as a system information block (SIB), an RRC reconfiguration message, an RRC connection establishment message, an RRC connection re-establishment message, a connection resume message, a connection release message, or a connection suspend message.

Optionally, when the TAT configuration information includes the first TAT, the configuration information further includes one or more types of the following information:

resource information used to asynchronously send the uplink data, hybrid automatic repeat request HARQ process information used to asynchronously send the uplink data, resource information used to synchronously send the uplink data, HARQ process information used to synchronously send the uplink data, a sequence code used for asynchronous sending, and a sequence code used for synchronous sending.

It should be understood that the resource information used to asynchronously or synchronously send the uplink data includes one or more of a frequency domain resource, a time domain resource, and a code resource. The sequence code used for asynchronous sending may be a preamble.

Optionally, there is a correspondence between the sequence code used for asynchronous sending or a resource used for sending the sequence code and a resource used to asynchronously send the uplink data. This correspondence may be indicated in a network device in a configuration message.

Optionally, when the first TAT expires, the terminal device may clear data in a hybrid automatic repeat request HARQ process used to send the uplink data and a resource used to send the uplink data, and enable an asynchronous manner for initial transmission or retransmission; or when the first TAT expires, the terminal device may not clear data in a hybrid automatic repeat request HARQ process used to send the uplink data, and asynchronously send the data buffered in the HARQ, where the HARQ process may be all HARQ processes used for synchronous sending or asynchronous sending. Optionally, if a data resource used for asynchronous sending is configured, preferably, the data resource used for asynchronous sending is not cleared, or in other words, the data resource used for asynchronous sending is reserved when the first TAT expires.

It may be understood that, if a HARQ process used for synchronous sending is configured, preferably, data in the HARQ process used for synchronous sending is cleared when the first TAT expires.

Optionally, if all HARQ processes may be used for synchronous and asynchronous sending, preferably, data in all the HARQ processes is cleared when the first TAT expires.

Optionally, if a data resource used for synchronous sending is configured, preferably, the data resource used for synchronous sending is cleared when the first TAT expires.

Optionally, if all data resources may be used for synchronous and asynchronous sending, preferably, when the first TAT expires, a resource for data sending is reserved for asynchronously sending data.

Optionally, if all data resources may be used for synchronous and asynchronous sending, preferably, data in a HARQ process is not cleared when the first TAT expires.

Optionally, if a HARQ process corresponding to a resource used for asynchronous sending and a HARQ process corresponding to a resource used for synchronous sending are shared, data in the HARQ process corresponding to the resource used for synchronous sending is cleared when the first TAT expires.

Optionally, when the first TAT expires, the terminal device may asynchronously send the uplink data by using a TA value obtained when the first TAT expires, that is, a TA value maintained by the terminal, or by using TA=0.

Optionally, in another embodiment of this application, the TAT configuration information includes a second TAT, and the second TAT is used to control an effective time of an uplink timing advance for asynchronous sending.

Optionally, when the TAT configuration information includes the second TAT, a second TAT corresponding to a TAG indicated by a TA command is started or restarted when the terminal device receives a timing advance TA sent by the network device.

Optionally, when the TAT configuration information includes the second TAT, in step 240, the terminal device asynchronously sends the uplink data when the second TAT runs; or the terminal device stops sending the uplink data when the second TAT does not run or expires.

Optionally, when the TAT configuration information includes the second TAT, the terminal compares running duration with a threshold when the second TAT runs, to determine whether to perform asynchronous sending. For example, a physical uplink shared channel (PUSCH) is synchronously sent when running duration of the second TAT is less than or equal to the threshold. For example, the PUSCH is asynchronously sent when the running duration of the second TAT is greater than or equal to the threshold. Preferably, a terminal that supports non-orthogonal multiple access sending or asynchronous sending performs the determining to determine a sending manner. In tins case, the terminal device asynchronously sends the uplink data when the second TAT runs, so that the terminal device transmits the uplink data to the network device in an asynchronous sending manner.

Optionally, the configuration message may be a message such as a system information block (SIB), an RRC reconfiguration message, an RRC connection establishment message, an RRC connection re-establishment message, a connection resume message, a connection release message, or a connection suspend message.

Optionally, when the TAT includes the second TAT, the configuration information further includes one or more types of the following information: resource information used to asynchronously send the uplink data and hybrid automatic repeat request HARQ process information used to asynchronously send the uplink data. When the terminal determines the sending manner by comparing the running duration with the threshold, the network device may further configure one or more types of the following information for the terminal: resource information used to synchronously send the uplink data and hybrid automatic repeat request HARQ process information used to synchronously send the uplink data.

It should be understood that the resource information used to asynchronously or synchronously send the uplink data includes one or more of a frequency domain resource, a time domain resource, and a code resource. A code resource for asynchronous sending may include a preamble and a time-frequency resource for sending the preamble.

Optionally, when the second TAT expires, the terminal device stops sending the uplink data, and clears data in a hybrid automatic repeat request HARQ process used to send the uplink data and a resource used to asynchronously send the uplink data.

Optionally, when the second TAT runs, the terminal device may asynchronously send the uplink data by using TA=0 or a maintained TA value.

Optionally, in still another embodiment of this application, the TAT configuration information includes a first TAT and a second TAT, the first TAT is used to control an effective time of an uplink timing advance for synchronous sending, and the second TAT is used to control an effective time of an uplink timing advance for asynchronous sending.

Optionally, when the TAT configuration information includes the first TAT and the second TAT, the first TAT is started or restarted when the terminal device receives a timing advance TA sent by the network device, and the second TAT is started or restarted when the first TAT expires. In step 240, the terminal device synchronously sends the uplink data when the first TAT runs; or the terminal device asynchronously sends the uplink data when the first TAT does not run and the second TAT runs; or the terminal device stops sending the uplink data when neither the first TAT nor the second TAT runs. Management of HARQ data and a data resource described in another embodiment may also be applied to tins embodiment.

Optionally, if a HARQ process used for synchronous sending is configured, preferably, data in the HARQ process used for synchronous sending is cleared when the first TAT expires. Optionally, if a data resource used for synchronous sending is configured, preferably, the data resource used for synchronous sending is cleared when the first TAT expires.

Optionally, if all HARQ processes may be used for synchronous and asynchronous sending, preferably, data in all the HARQ processes is cleared when the first TAT expires. Optionally, if all data resources may be used for synchronous and asynchronous sending, preferably, when the first TAT expires, a resource for data sending is reserved for asynchronously sending data.

Optionally, if a HARQ process used for asynchronous sending is configured, data in the HARQ process used for asynchronous sending is cleared when the second TAT expires.

Optionally, if a data resource used for asynchronous sending is configured, preferably, the data resource used for asynchronous sending is cleared when the second TAT expires.

Optionally, if all HARQ processes may be used for synchronous and asynchronous sending, data in all the HARQ processes is cleared when the second TAT expires.

Optionally, if all resources are used for synchronous and asynchronous data sending, all the resources are cleared when the second TAT expires. In tins case, the terminal device synchronously sends the uplink data when the first TAT runs, or in other words, when the first TAT does not expire; or the terminal device asynchronously sends the uplink data, when the first TAT does not run and the second TAT runs, so that the terminal device cannot only synchronously send the uplink data to the network device, but also transmit the uplink data to the network device in an asynchronous sending manner.

Optionally, the configuration message may be a message such as a system information block (SIB), an RRC reconfiguration message, an RRC connection establishment message, an RRC connection re-establishment message, a connection resume message, a connection release message, or a connection suspend message.

For example, timeAlignmentTimer2 is added to the configuration message to indicate duration that is of the second TAT and that is used to manage a TA for asynchronous sending.

```
 -- TAG ::= SEQUENCE {
     tag-Id         TAG-Id,
     timeAlignmentTimer1    TimeAlignmentTimer,
     timeAlignmentTimer2    TimeAlignmentTimer,
     ...
 }
```

Optionally, when the TAT configuration information includes the first TAT and the second TAT, the configuration information further includes one or more types of the following information:

resource information used to asynchronously send the uplink data, hybrid automatic repeat request HARQ process information used to asynchronously send the uplink data, resource information used to synchronously send the uplink data, HARQ process information used to synchronously send the uplink data, a preamble code for asynchronous sending, and a time-frequency resource used for sending a preamble.

It should be understood that the resource information used to asynchronously or synchronously send the uplink data includes one or more of a frequency domain resource, a time domain resource, and a code resource.

Optionally, when the first TAT expires, the terminal device stops synchronously sending the uplink data in a cell included in a TAG corresponding to the TAT, and the terminal device may clear data in a hybrid automatic repeat request HARQ process used to send the uplink data and a resource used to synchronously send the uplink data in the cell, and enable asynchronous sending for initial transmission or retransmission; or when the first TAT expires, the terminal device may not clear data in a hybrid automatic repeat request HARQ process used to send the uplink data in the cell, and asynchronously send the data buffered in the HARQ.

Optionally, if a first TAT of a primary timing advance group (PTAG) of the terminal device expires, for all serving cells of the terminal device, data buffered in a HARQ process for non-asynchronous sending is cleared, and a resource for non-asynchronously sending the uplink data is deleted.

Optionally, if a first TAT of a secondary timing advance group (STAG) of the terminal de vice expires, for a serving ceil that belongs to the STAG of the terminal de vice, data buffered in a HARQ process for non-asynchronous sending is cleared, and a resource for non-asynchronously sending the uplink data is deleted.

It should be understood that the terminal device may be located in different tuning advance groups. The timing advance group (TAG) is a group of serving cells configured with uplink resource, and the serving ceils use a same timing reference cell and a same timing advance value TA A TAG that includes a special cell (SpCell) is referred to as a primary TAG, and a TAG that includes a non-Spcell cell is referred to as a secondary TAG. The primary TAG includes a primary ceil (PCell) or a primary secondary cell (PSCell).

Optionally, during running of the second TAT, uplink transmission is performed on a resource used for asynchronous sending in a cell in a TAG corresponding to the second TAT. For example, in the cell in the TAG corresponding to the second TAT, data in all HARQ processes is asynchronously sent. In this case, retransmitted data or initially transmitted data is asynchronously sent; or data in a HARQ process used for asynchronous sending is asynchronously sent.

Optionally, the terminal device may asynchronously send the uplink data by using a maintained TA value or by using TA=0.

Optionally, when the second TAT expires, the terminal device stops all uplink sending, and clears data in a hybrid automatic repeat request HARQ process used to asynchronously send the uplink data and a resource used to asynchronously send the uplink data.

Optionally, when the second TAT expires, the terminal device stops all uplink sending, and clears data in all hybrid automatic repeat request HARQ processes and all resources used to send the uplink data.

Optionally, when the TAT configuration information includes the first TAT and the second TAT, if the terminal device receives a timing advance TA sent by the network device, the first TAT and the second TAT associated with the TAG corresponding to the TA are started or restarted, or in other words, the first TAT and the second TAT start to run simultaneously. The terminal device synchronously sends the uplink data when the first TAT runs; or the terminal device asynchronously sends the uplink data when the first TAT does not run and the second TAT runs; or the terminal device stops sending the uplink data when neither the first TAT nor the second TAT runs.

Optionally, timing duration of the first TAT is different from timing duration of the second TAT. For example, the timing duration of the first TAT is less than the timing duration of the second TAT.

Optionally, when a maximum TA difference of the terminal device is greater than or equal to a first threshold and is less than or equal to a second threshold, it is determined that a TAT of a TAG in which a secondary cell is located expires, and the uplink data is asynchronously sent to the secondary cell, where the maximum TA difference is a maximum difference between TAs of any two of TAGs of the terminal device, and the secondary cell belongs to one of the any two TAGs;

when the maximum TA difference of the terminal device is greater than the second threshold, the terminal device stops sending the uplink data to the secondary cell; or when a maximum TA difference of the terminal device is greater than a third threshold, it is determined that a TAT of a TAG in which a secondary cell is located expires, and the uplink data is asynchronously sent to the secondary cell, where the maximum TA difference is a maximum difference between TAs of any two of TAGs of the terminal device, and the secondary cell belongs to one of the any two TAGs.

When the maximum TA difference of the terminal device is greater than or equal to the first threshold and is less than or equal to the second threshold, it is determined that the TAT of the TAG in which the secondary cell is located expires, and the uplink data is asynchronously sent to the secondary cell. To be specific, when a difference between a TA of a first TAG of the terminal device and a TA of a second TAG of the terminal device is greater than or equal to the first threshold and less than or equal to the second threshold, it is determined that the TAT of the first TAG expires, and the uplink data is asynchronously sent to the secondary cell. The first TAG is a TAG in which the secondary cell is located, and the second TAG is a TAG with a minimum or maximum TA value in the TAGs of the terminal.

When the maximum TA difference of the terminal device is greater than the third threshold, it is determined that the TAT of the TAG in which the secondary cell is located expires, and the uplink data is asynchronously sent to the secondary cell. To be specific, when a difference between a TA of a first TAG of the terminal device and a TA of a second TAG of the terminal device is greater than the third threshold, it is determined that the TAT of the first TAG expires, and the uplink data is asynchronously sent to the secondary cell. The first TAG is a TAG in which the secondary cell is located, and the second TAG is a TAG with a minimum or maximum TA value in the TAGs of the terminal.

Specifically, two thresholds may be set for the maximum TA difference, for example, the first threshold and the second threshold, and whether the TAT of the TAG in which the secondary cell is located expires is determined based on a relationship between the maximum TA difference, and the first threshold and the second threshold. When the maximum TA difference is less than the first threshold, it is determined that the TAT of the TAG in which the secondary cell is located does not expire, and the terminal device synchronously send the uplink data to the secondary cell; or when the maximum TA difference is greater than or equal to the first threshold and less than or equal to the second threshold, it is determined that the TAT of the TAG in which the secondary cell is located expires, and the uplink data is asynchronously sent to the secondary cell; or when the maximum TA difference is greater than the second threshold, the terminal device stops sending the uplink data to the secondary cell.

A threshold may be further set for the maximum TA difference, for example, the third threshold, and whether the TAT of the TAG in which the secondary cell is located expires is determined based on a relationship between the maximum TA difference and the third threshold. When the maximum TA difference is less than or equal to the third threshold, it is determined that the TAT of the TAG in which the secondary cell is located does not expire, and the terminal device synchronously sends the uplink data to the secondary cell; or when the maximum TA difference is greater than the third threshold, it is determined that the TAT of the TAG in which the secondary cell is located expires, and the uplink data is asynchronously sent to the secondary cell.

The foregoing first, second, and third thresholds are merely used to distinguish described objects, and cannot be understood as indicating or implying relative importance, or as indicating or implying a sequence, and values of these thresholds are not limited. For example, the third threshold may be equal to the first threshold or the second threshold, or may not be equal to the first threshold or the second threshold.

It should be understood that, in this application, when the maximum TA difference is equal to a threshold, a sending manner in which the terminal device sends the uplink data to the secondary cell is not limited. For example, if the third threshold is set for the maximum TA difference, when the maximum TA difference is less than the third threshold, it is determined that the terminal device synchronously sends the uplink data to the secondary cell; or when the maximum TA difference is greater than or equal to the third threshold, it is determined that the terminal device asynchronously sends the uplink data to the secondary cell. In other words, when the maximum TA difference is less than the third threshold, the terminal device synchronously sends the uplink data to the secondary cell; or when the maximum TA difference is greater than the third threshold, the terminal device asynchronously sends the uplink data to the secondary cell; or when the maximum TA difference is equal to the third threshold, the terminal device may asynchronously or synchronously send the uplink data to the secondary cell.

The maximum TA difference is a maximum difference between TAs of any two of TAGs of the terminal device. For example, the network device configures a TAG1 to a TAG5 for the terminal device, and the TAG1 is a TAG in which the secondary cell is located. In this case, a TA of the TAG1 is separately compared with maintained TAs of the TAG2 to the TAG5, and a maximum difference between TAs is a maximum TA difference.

Figure 3:
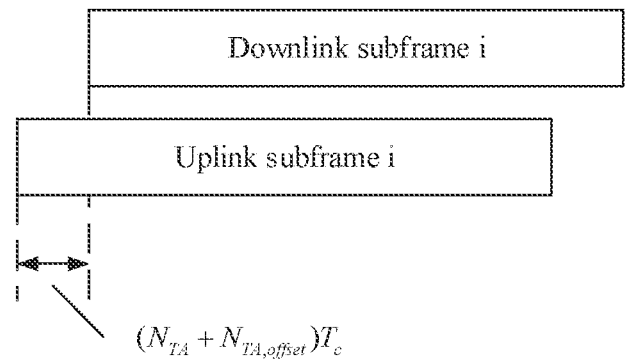
FIG. 3 is a schematic diagram of a TA according to an embodiment of this application.

It may be understood that a TA difference is an uplink sending timing difference of two TAGs of the terminal device. As shown in FIG. 3, a TA value $N_{TA}$ shown in FIG. 3 represents a timing difference between an uplink frame and a downlink frame of a cell in the TAG. NTA is a TA value of a TAG maintained by the terminal device, Offset is a timing adjustment offset indicated by a TA command sent by the network device, and Tc is a time unit, for example, microsecond.

Optionally, when the terminal device reselects a target cell in place of a source cell, the first TAT or the second TAT running on the terminal device is stopped, where the first TAT or the second TAT is started in the source cell.

Specifically, when the terminal device in an idle mode or in an inactive mode reselects the target cell in place of the source cell, a third TAT or a fourth TAT of the reselected target cell may be obtained. The third TAT or the fourth TAT may be broadcast and indicated by reading a serving cell on which the terminal device camps, or may be indicated by using an upper-layer message such as a connection release/resume message. The third TAT is used to control an effective time of an uplink timing advance for synchronous sending in the target cell, and the fourth TAT is used to control an effective time of an uplink timing advance for asynchronous sending in the target cell. The target cell and the source cell may belong to different TAT groups, that is, the timing duration of the first TAT is not equal to timing duration of the third TAT, or the timing duration of the second TAT is not equal to timing duration of the third TAT, or frame timing of the target cell and the source cell is not aligned. Therefore, when the terminal device reselects the target cell in place of the source cell, to ensure communication quality, the second TAT or the first TAT running on the terminal device needs to be stopped.

Optionally, when the terminal device reselects the target cell in place of the source cell, the terminal device determines that the source cell and the target cell belong to a same TAT group, and when the source cell and the target cell belong to a same TAT group, the terminal device determines to use a TAT of the source cell in the target cell. A same TAT group may be understood as one or more cells corresponding to a same TAT Optionally, when the terminal device reselects the target cell in place of the source cell, the terminal device determines, based on indication information sent by the source cell or the target cell, that the source cell and the target cell belong to a cell to which a same TAT applies.

Optionally, when the source cell and the target cell belong to a same TAT group, the terminal may continue to run a TAT started in the source cell.

Specifically, when the terminal device in an idle mode or an inactive mode reselects the target cell in place of the source cell, the terminal device determines that the source cell and the target cell belong to a same TAT group, and when the source cell and the target cell belong to a same TAT group, the terminal device determines to use the TAT of the source cell in the target cell. For example, the terminal device uses the first TAT or the second TAT in the source cell. When the terminal device is handed over to the target cell, if the source cell and the target cell belong to a same TAT group, the terminal device still uses the first TAT or the second TAT in the target cell.

Optionally, the network device indicates a cell or an RNA radio network area identifier, or a tracking area identifier applicable to the first TAT and the second TAT Network devices may exchange TAT duration configured for a cell or an RNA. After reselecting the target cell, the terminal device determines whether the target cell and the source cell that receives a TA command last time belong to a same TAT. If the target cell and the source cell that receives the TA command last time belong to a same TAT, the first TAT or the second TAT continues to run. The first TAT or the second TAT is stopped if the target cell and the source cell that receives the TA command last time do not belong to a same TAT.

Optionally, the uplink data is asynchronously sent when the first TAT expires or does not run, and the first TAT is started in the source cell; or the uplink data is asynchronously sent when the second TAT runs, and the second TAT is started in the source cell.

Specifically, when the source cell and the target cell belong to a same TAT group, it is determined that the TAT of the source cell is used in the target cell, and in the target cell, the terminal device still uses the first TAT and/or the second TAT configured in the source cell. If the terminal device configures the first TAT in the source cell, the terminal device synchronously sends the uplink data when the first TAT runs in the target cell; or the terminal device asynchronously sends the uplink data when the first TAI does not run or expires; or if the terminal device configures the first TAT and the second TAT in the source cell, the terminal device synchronously sends the uplink data when the first TAT rims in the target cell; or the terminal device asynchronously sends the uplink data when the first TAT does not run and the second TAT runs; or the terminal device stops sending the uplink data when the first TAT and the second TAT do not run.

Optionally, when a TA sent by a network device of the target cell is received, the second TAT is stopped, and a third TAT of the target cell is started, where the third TAT is used to control an effective time of an uplink timing advance for asynchronous sending; and the uplink data is asynchronously sent when the third TAT of the target cell runs.

Optionally, a method for determining that the second TAT of the source cell does not expire may include: when timing duration of the second TAT of the source cell is less than timing duration of a fourth TAT of the target cell, determining that the second TAT of the source cell does not expire; or when timing duration of a fourth TAT of the target cell is greater than a current timing value of the second TAI of the source cell, determining that the second TAT of the source cell does not expire.

Specifically, when the terminal device reselects the target cell in place of the source cell, if the target cell and the source cell belong to a same TAT group, the terminal device may use the second TAT of the source cell in the target cell, and the terminal device asynchronously sends the uplink data when the second TAT does not expire. It may be determined, in the following two implementations, that the second TAT does not expire. In one implementation, when the timing duration of the second TAT of the source cell is less than the timing duration of the fourth TAT of the target cell, it is determined that the second TAT of the source cell does not expire. For example, the timing duration of the second TAT of the source cell is 10 s, and the timing duration of the fourth TAT of the target cell is 15 s. Because the timing duration 10 s of the second TAT of the source cell is less than the timing duration 15 s of the fourth TAT of the target cell, it is determined that the second TAT of the source cell does not expire. In another implementation, when the timing duration of the fourth TAT of the target cell is greater than the current timing value of the second TAT of the source cell, it is determined that the second TAT of the source cell does not expire. For example, the timing duration of the fourth TAT of the target cell is 15 s, and the current timing value of the second TAT of the source cell is 8 s. Because the timing duration 15 s of the fourth TAT of the target cell is greater than the current timing value 8 s of the second TAT of the source cell, it is determined that the second TAT of the source cell does not expire.

Optionally, the source cell in which the terminal device is located may indicate a downlink timing offset difference from the target cell, or the target cell in which the terminal device is located may indicate a downlink timing offset difference from the source cell. After the terminal device reselects the target cell, a TA value of the target cell is determined based on a TA value maintained by the source cell and the downlink timing offset difference, and the TA value of the target cell may be used during synchronous or asynchronous sending.

Optionally, the terminal device may further determine the timing duration of the second TAT in a manner agreed upon in a protocol.

Optionally, that the terminal device receives the TAT configuration information in step 220 includes: The terminal device receives a broadcast message, where the broadcast message includes the TAT configuration information, and the TAT configuration information includes a first TAT and a second TAT; and the terminal device determines, based on a capability of the terminal device, timing duration for using the first TAT or the second TAT.

Specifically, the network device may send the broadcast message to the terminal device in a cell. The terminal device receives the broadcast message sent by the network device, and the broadcast message includes the first TAT and the second TAT The terminal device may determine, based on whether the terminal device can perform synchronous sending or asynchronous sending, to use the first TAT or the second TAT. If the terminal device supports synchronous sending, the terminal device determines to use the first TAT; or if the terminal device supports asynchronous sending or non-orthogonal multiple access sending, the terminal device determines to use the second TAT.

For the terminal in a non-connected mode, when whether to use synchronous or asynchronous sending is not explicitly indicated in a network, the terminal supports asynchronous sending based on the capability of the terminal, and asynchronously transmits data if the second TAT used by the terminal does not expire.

Optionally, that the terminal device receives the TAT configuration information in step 220 includes: The terminal device receives a broadcast message, where the broadcast message includes a first TAT; and the terminal device determines timing duration of using the first TAT.

If the terminal device in a non-connected mode supports asynchronous sending, asynchronous transmission may be performed after the first TAT expires.

Optionally, the method 200 further includes: The terminal device receives indication information used for synchronous or asynchronous sending from a message such as a handover command, a connection reconfiguration message, a connection release message, a connection resume message, a connection re-establishment message, packet data convergence protocol (PDCP) control signaling, MAC signaling, or physical layer signaling, and determines a manner of sending the uplink data.

Specifically, the message such as the handover command, the connection reconfiguration message, the connection release message, the connection resume message, the connection re-establishment message, the PDCP control signaling, the MAC signaling, or the physical layer signaling sent by the network device may include the indication information, and the indication information is used to indicate the manner of sending the uplink data by the terminal device. The terminal device determines, according to the received indication information, the manner of sending the uplink data.

For example, the handover command instructs the terminal device whether to asynchronously send the uplink data in the target cell. The uplink data may be a handover completion message or the like.

For example, when a secondary cell with carrier aggregation or dual connectivity is added, the terminal device is instructed whether to asynchronously send the uplink data to the added secondary cell. The uplink data may be a reconfiguration completion message or the like. Preferably, the secondary cell does not belong to a TAG of a current running TAT.

Optionally, a capability of whether the terminal device in an inactive mode or a connected mode supports asynchronous sending may be reported to the network device.

Optionally, the terminal device determines, based on the indication information that is used for synchronous or asynchronous sending and that is received from the handover command or the connection reconfiguration message and the capability of the terminal device, the manner of sending the uplink data.

Specifically, the terminal device determines, based on the indication information sent by the network device and the capability of the terminal device, the manner of sending the uplink data. For example, the terminal device synchronously sends the uplink data if the indication information indicates the terminal device to perform asynchronous sending but the terminal device does not support asynchronous sending of the uplink data. For another example, the terminal device asynchronously sends the uplink data if the indication information indicates the terminal device to perform asynchronous sending and the terminal device supports asynchronous sending of the uplink data.

Optionally, the method 200 further includes: The terminal device determines a downlink transmission delay based on a sending time that is of downlink data and that is indicated by the network device and a receiving time of receiving the downlink data by the terminal device; and determines an uplink timing advance TA based on the downlink transmission delay.

For example, the network device sends data of a radio frame 1 at a moment T1, and the data of the radio frame 1 includes the moment T1 at which the network device sends the radio frame 1. The terminal device receives a system frame number SFN1 at a moment T2, and a downlink transmission delay is T2−T1. It is assumed that a difference between uplink and downlink sending delays is relatively small. In this case, the terminal device estimates an uplink transmission delay and a round trip delay based on the downlink transmission delay. For example, if the terminal device determines that the uplink transmission delay is T2−T1, the round trip delay is 2*(T2−T1). The terminal device determines a timing advance TA of an uplink frame by using the round trip delay.

In this case, the terminal device determines the downlink transmission delay based on the sending time that is of the downlink data and that is indicated by the network device and the receiving time of receiving the downlink data by the terminal device, and determines the uplink timing advance TA based on the downlink transmission delay. The terminal device may estimate a TA based on a transmission delay, and adjust the TA without entirely relying on the network device, thereby improving accuracy of controlling uplink sending timing of the terminal device within a CP range as much as possible, and reducing detection complexity of the network device.

It should be understood that when performing synchronous sending based on the first TAT, the terminal device may use the TA determined by the terminal device, and when performing asynchronous sending based on the second TAT, the terminal device may also use the TA determined by the terminal device.

Optionally, the method further includes: The terminal device adjusts uplink sending timing based on the determined uplink timing advance, and synchronously or asynchronously sends the uplink data to the network device; or asynchronously sends the uplink data when the uplink timing advance exceeds a predefined threshold; or synchronously sends the uplink data when the uplink timing advance does not exceed a predefined threshold.

Specifically, the terminal device synchronously sends the uplink data to the network device when adjusting the uplink sending timing based on the determined uplink timing advance; or the terminal device does not adjust the uplink sending timing, and determines, based on the determined uplink timing advance and the predefined threshold, the manner of sending the uplink data. The uplink data is asynchronously sent when the determined uplink timing advance exceeds the predefined threshold; or the uplink data is synchronously sent when the determined uplink timing advance does not exceed the predefined threshold.

Optionally, the terminal device receives configuration information of the network device, where the configuration information indicates the terminal to perform timing adjustment by using the determined uplink timing advance TA.

Specifically, the network device configures, based on a capability that the terminal supports timing adjustment, the terminal device to enable the function.

In this case, the terminal device determines, based on the determined uplink timing advance, the manner of sending the uplink data, so that the terminal device can synchronously or asynchronously send the uplink data.

The following is another wireless communication method provided in this application. The method may be applied to the scenario shown in FIG. 1, and certainly may also be applied to another communication scenario. This is not limited in this embodiment of this application.

The method includes: when a maximum TA difference of a terminal device is greater than or equal to a first threshold and is less than or equal to a second threshold, determining that a TAT of a TAG in which a secondary cell is located expires, and asynchronously sending the uplink data to the secondary cell, where the maximum TA difference is a maximum difference between TAs of any two of TAGs of the terminal device, and the secondary cell belongs to one of the any two TAGs; or when a maximum TA difference of the terminal device is greater than a third threshold, determining that a TAT of a TAG in winch a secondary cell is located expires, and asynchronously sending the uplink data to the secondary cell, where the maximum TA difference is a maximum difference between TAs of any two of TAGs of the terminal device, and the secondary cell belongs to one of the any two TAGs.

Therefore, in this embodiment of tins application, when the maximum TA difference of the terminal device is greater than or equal to the first threshold and less than or equal to the second threshold, or when the maximum TA difference of the terminal device is greater than the third threshold, it is determined that the TAT of the TAG in which the secondary cell is located expires, and the uplink data is asynchronously sent to the secondary cell, so that the terminal device asynchronously sends the uplink data.

When the maximum TA difference of the terminal device is greater than or equal to the first threshold and is less than or equal to the second threshold, it is determined that the TAT of the TAG in which the secondary cell is located expires, and the uplink data is asynchronously sent to the secondary cell. To be specific, when a difference between a TA of a first TAG of the terminal device and a TA of a second TAG of the terminal device is greater than or equal to the first threshold and less than or equal to the second threshold, it is determined that the TAT of the first TAG expires, and the uplink data is asynchronously sent to the secondary cell. The first TAG is a TAG in winch the secondary cell is located, and the second TAG is a TAG with a minimum TA value in the TAGs of the terminal.

When the maximum TA difference of the terminal device is greater than the third threshold, it is determined that the TAT of the TAG in which the secondary cell is located expires, and the uplink data is asynchronously sent to the secondary cell. To be specific, when a difference between a TA of a first TAG of the terminal device and a TA of a second TAG of the terminal device is greater than the third threshold, it is determined that the TAT of the first TAG expires, and the uplink data is asynchronously sent to the secondary cell. The first TAG is a TAG in which the secondary cell is located, and the second TAG is a TAG with a minimum TA value in the TAGs of the terminal.

Specifically, two thresholds may be set for the maximum TA difference, for example, the first threshold and the second threshold, and whether the TAT of the TAG m which the secondary cell is located expires is determined based on a relationship between the maximum TA difference, and the first threshold and the second threshold. When the maximum TA difference is less than the first threshold, it is determined that the TAT of the TAG in which the secondary cell is located does not expire, and the terminal device synchronously send the uplink data to the secondary cell; or when the maximum TA difference is greater than or equal to the first threshold and less than or equal to the second threshold, it is determined that the TAT of the TAG in winch the secondary cell is located expires, and the uplink data is asynchronously sent to the secondary ceil; or when the maximum TA difference is greater than the second threshold, the terminal device stops sending the uplink data to the secondary cell.

A threshold may be further set for the maximum TA difference, for example, the third threshold, and whether the TAT of the TAG in which the secondary cell is located expires is determined based on a relationship between the maximum TA difference and the third threshold. When the maximum TA difference is less than or equal to the third threshold, it is determined that the TAT of the TAG in which the secondary cell is located does not expire, and the terminal device synchronously sends the uplink data to the secondary cell; or when the maximum TA difference is greater than the third threshold, it is determined that the TAT of the TAG in which the secondary ceil is located expires, and the uplink data is asynchronously sent to the secondary cell.

The maximum TA difference is a maximum difference between TAs of any two of TAGs of the terminal device. For example, the network device configures a TAG1 to a TAG5 for the terminal device, and the TAG1 is a TAG in which the secondary ceil is located. In this case, a TA of the TAG1 is separately compared with TAs of the TAG2 to the TAG5, and a maximum difference between TAs is a maximum TA difference.

It may be understood that a TA difference is an uplink sending timing difference of two TAGs of the terminal device. As shown in FIG. 3, a TA value herein represents a timing difference between an uplink frame and a downlink frame of a cell in the TAG.

Optionally, when determining that the TAT of the TAG in which the secondary cell is located expires, the terminal device stops synchronously sending the uplink data to the secondary cell, and the terminal device may clear data in a hybrid automatic repeat request HARQ process used to synchronously send the uplink data and a resource used to synchronously send the uplink data, and enable asynchronous sending for initial transmission or retransmission; or when determining that the TAT of the TAG in which the secondary cell is located expires, the terminal device may not clear data in a hybrid automatic repeat request HARQ process used to synchronously send the uplink data, and asynchronously send the data buffered in the HARQ.

Optionally, the first threshold, the second threshold, and the third threshold may be agreed upon in a protocol or may be configured by the network device.

Figure 4:
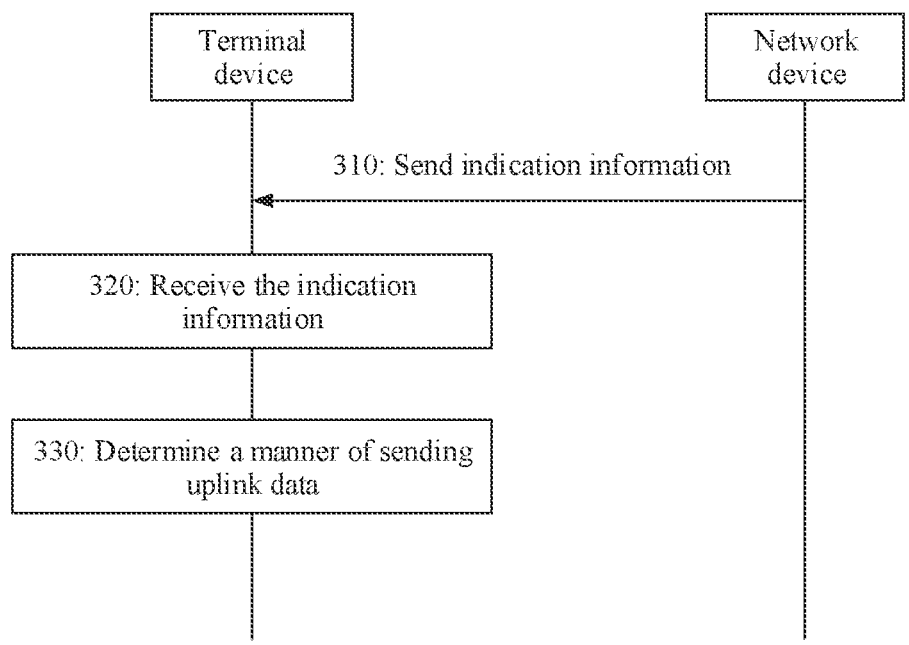
FIG. 4 is a schematic flowchart of a wireless communication method according to an embodiment of this application.

With reference to FIG. 4, the following describes in detail another wireless communication method 300 provided in this application. FIG. 4 is a schematic flowchart of a wireless communication method 300 according to an embodiment of this application. The method 300 may be applied to the scenario shown in FIG. 1, and certainly may also be applied to another communication scenario. This is not limited in this embodiment of this application.

In step 310, a network device sends indication information to a terminal device, where the indication information is used to indicate the terminal device to asynchronously or synchronously send uplink data.

In step 320, the terminal device receives the indication information sent by the network device.

In step 330, the terminal device determines, based on the indication information, a manner of sending the uplink data.

Optionally, the indication information may be carried in a message that is sent by the network device to the terminal device, such as a handover command, a connection reconfiguration message, a connection release message, a connection resume message, a connection re-establishment message, PDCP control signaling, MAC signaling, or physical layer signaling.

Specifically, the message such as the handover command, the connection reconfiguration message, the connection release message, the connection resume message, the connection re-establishment message, the PDCP control signaling, the MAC signaling, or the physical layer signaling sent by the network device may include the indication information, and the indication information is used to indicate the manner of sending the uplink data by the terminal device. The terminal device determines, according to the received indication information, the manner of sending the uplink data.

For example, the handover command instructs the terminal device whether to asynchronously send the uplink data in a target cell. The uplink data may be a handover completion message or the like.

For example, when a secondary cell with carrier aggregation or dual connectivity is added, the terminal device is instructed whether to asynchronously send the uplink data to the added secondary cell. The uplink data may be a reconfiguration completion message or the like. Preferably, the secondary ceil does not belong to a TAG of a current running TAT.

Optionally, a capability of whether the terminal device in an inactive mode or a connected mode supports asynchronous sending may be reported to the network device.

Optionally, the terminal device determines, based on the indication information and the capability of the terminal device, the manner of sending the uplink data.

Specifically, the terminal device determines, based on the indication information sent by the network device and the capability of the terminal device, the manner of sending the uplink data. For example, the terminal device synchronously sends the uplink data if the indication information indicates the terminal device to perform asynchronous sending but the terminal device does not support asynchronous sending of the uplink data. For another example, the terminal device asynchronously sends the uplink data if the indication information indicates the terminal device to perform asynchronous sending and the terminal device supports asynchronous sending of the uplink data.

Figure 5:
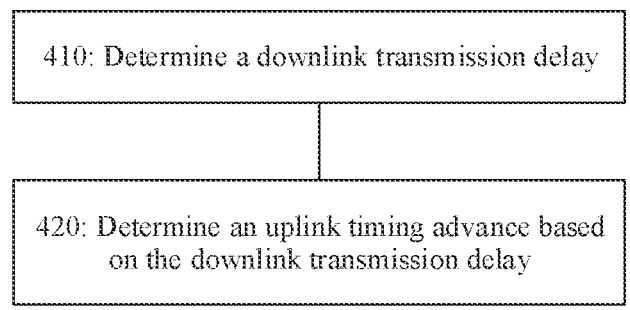
FIG. 5 is a schematic flowchart of a wireless communication method according to an embodiment of this application.

With reference to FIG. 5, the following describes in detail another wireless communication method 400 provided in this application. FIG. 5 is a schematic flowchart of a wireless communication method 400 according to an embodiment of this application. The method 400 may be applied to the scenario shown in FIG. 1, and certainly may also be applied to another communication scenario. This is not limited in this embodiment of this application.

In step 410, a terminal device determines a downlink transmission delay based on a sending time that is of downlink data and that is indicated by a network device and a receiving time of receiving the downlink data by the terminal device.

In step 420, the terminal device determines an uplink timing advance TA based on the downlink transmission delay.

For example, the network device sends data of a radio frame 1 at a moment T1, and the data of the radio frame 1 includes the moment T1 at which the network device sends the radio frame 1. The terminal device receives a system frame number SFN1 at a moment T2, and a downlink transmission delay is T2−T1. It is assumed that a difference between uplink and downlink sending delays is relatively small. In this case, the terminal device estimates an uplink transmission delay and a round trip delay based on the downlink transmission delay. For example, if the terminal de v ice determines that the uplink transmission delay is T2−T1, the round trip delay is 2*(T2−T1). The terminal device determines a timing advance TA of an uplink frame by using the round trip delay.

In this case, the terminal device determines the downlink transmission delay based on the sending time that is of the downlink data and that is indicated by the network device and the receiving time of receiving the downlink data by the terminal device, and determines the uplink timing advance TA based on the downlink transmission delay. The terminal device may estimate a TA based on a transmission delay, and adjust the TA without entirely relying on the network device, thereby improving accuracy of controlling uplink sending timing of the terminal device within a CP range as much as possible, and reducing detection complexity of the network device.

It should be understood that the method 400 may be combined with the method 200. When performing synchronous sending based on the first TAT in the method 200, the terminal device may use the TA determined by the terminal device, and when performing asynchronous sending based on the second TAT in the method 200, the terminal device may also use the TA determined by the terminal device.

Optionally, the method further includes: The terminal device adjusts uplink sending timing based on the determined uplink timing advance, and synchronously or asynchronously sends the uplink data to the network device; or asynchronously sends the uplink data when the uplink timing advance exceeds a predefined threshold; or synchronously sends the uplink data when the uplink timing advance does not exceed a predefined threshold.

Specifically, the terminal device synchronously sends the uplink data to the network device when adjusting the uplink sending timing based on the determined uplink timing advance; or the terminal device does not adjust the uplink sending timing, and determines, based on the determined uplink timing advance and the predefined threshold, the manner of sending the uplink data. The uplink data is asynchronously sent when the determined uplink timing advance exceeds the predefined threshold; or the uplink data is synchronously sent when the determined uplink timing advance does not exceed the predefined threshold.

Optionally, the terminal device receives configuration information of the network device, where the configuration information indicates the terminal to perform timing adjustment by using the determined uplink timing advance TA.

Specifically, the network device configures, based on a capability that the terminal device supports timing adjustment, the terminal device to enable the function.

In this case, the terminal device determines, based on the determined uplink timing advance, the manner of sending the uplink data, so that the terminal device can synchronously or asynchronously send the uplink data.

It should be understood that in tins application, the terminal may also be referred to as the terminal device.

An embodiment of this application further provides an apparatus for implementing any one of the foregoing methods. For example, a communications apparatus 500 is provided, including units (or means) configured to implement the steps performed by the terminal device in any one of the foregoing methods.

Figure 6:
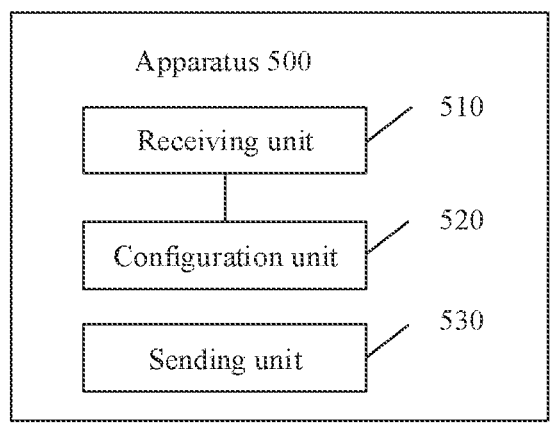
FIG. 6 is a schematic block diagram of an apparatus according to an embodiment of this application.

FIG. 6 is a schematic block diagram of the communications apparatus 500 provided in this application. As shown in FIG. 5, the communications apparatus 500 includes the following units.

a receiving unit 510, configured to receive timing advance timer TAT configuration information sent by a network device, where the TAT configuration information is used to configure duration of a TAT;

a configuration unit 520, configured to configure the TAT based on the TAT configuration information; and a sending unit 530, configured to asynchronously send uplink data based on a running status of the TAT It should be understood that the apparatus 500 corresponds to the terminal device in the method embodiment, and corresponding units perform corresponding steps. For details, refer to the corresponding method embodiment.

An embodiment of this application further provides a communications apparatus for implementing any one of the foregoing methods. For example, a communications apparatus 600 is provided, including units (or means) configured to implement the steps performed by the network device in any one of the foregoing methods.

Figure 7:
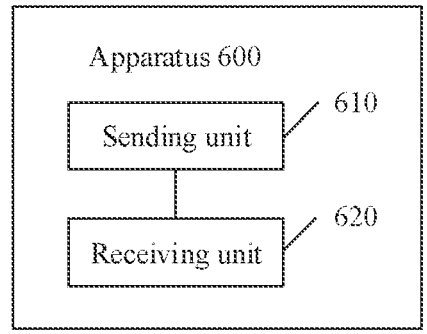
FIG. 7 is a schematic block diagram of an apparatus according to an embodiment of this application.

FIG. 7 is a schematic block diagram of the communications apparatus 600 provided in this application. As shown in FIG. 6, the apparatus 600 includes the following units.

a sending unit 610, configured to send timing advance timer TAT configuration information to a terminal device, where the TAT configuration information is used by the terminal device to configure duration of a TAT; and a receiving unit 620, configured to receive uplink data sent by the terminal device.

It should be understood that the apparatus 600 corresponds to the network device in the method embodiment, and corresponding units perform corresponding steps. For details, refer to the corresponding method embodiment.

It should be understood that division of units in the foregoing apparatus is merely logical function division. In actual implementation, all or some of the units may be integrated into one physical entity, or may be physically separate. In addition, all the units in the apparatus may be implemented by software invoked by a processing element, or all may be implemented by hardware, or some units may be implemented by software invoked by a processing element, and some units are implemented by hardware. For example, each unit may be an independently disposed processing element, or may be integrated into a chip of the apparatus for implementation. In addition, the unit may be alternatively stored in a memory in a form of a program, and a processing element of the apparatus invokes and executes a function of the unit. In addition, all or some of the units may be integrated together, or may be implemented independently. The processing element herein may be alternatively a processor, and may be an integrated circuit having a signal processing capability. In an implementation process, the steps of the foregoing method or the foregoing units may be implemented by using an integrated logic circuit of hardware in a processor element, or may be implemented by software invoked by a processing element.

In an example, the units in any one of the foregoing apparatuses may be one or more integrated circuits configured to implement the foregoing method, for example, one or more application-specific integrated circuits (ASIC), or one or more microprocessors (DSP), or one or more field programmable gate arrays (FPGA), or a combination of at least two of these integrated circuits. For another example, when a unit in the apparatus is implemented by a processing element invoking a program, the processing element may be a general purpose processor, for example, a central processing unit (CPU) or another processor that can invoke the program. For another example, these units may be integrated together, and are implemented in a form of a system-on-a-chip (SOC).

The above receiving unit is an interface circuit of the apparatus and is configured to receive a signal from another apparatus. For example, when the apparatus is implemented in a form of a chip, the receiving unit is an interface circuit that is of the chip and that is configured to receive a signal from another chip or apparatus. The above sending unit is an interface circuit of the apparatus and is configured to send a signal to another apparatus. For example, when the apparatus is implemented in a form of a chip, the sending unit is an interface circuit that is of the chip and that is configured to send a signal to another chip or apparatus.

Figure 8:
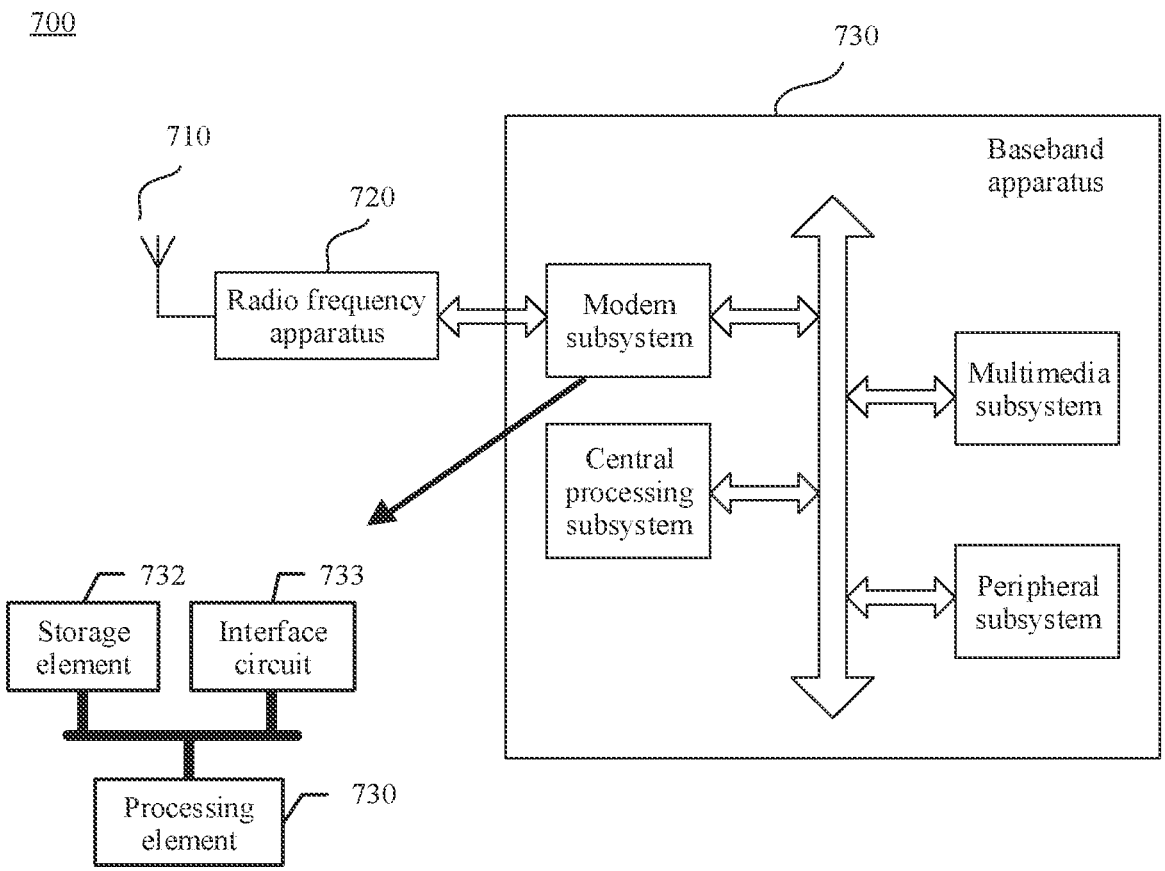
FIG. 8 is a schematic structural diagram of a terminal device according to an embodiment of this application.

FIG. 8 is a schematic structural diagram of a terminal 700 according to an embodiment of this application. The terminal 700 may be the terminal in the foregoing embodiment, and may be configured to implement the operations of the terminal in the foregoing embodiment. As shown in FIG. 7, the terminal 700 may include an antenna 710, a radio frequency part 720, and a signal processing part 730. The antenna 710 is connected to the radio frequency part 720. In a downlink direction, the radio frequency paid 720 receives, by using the antenna 710, information sent by a network device, and sends, to the signal processing part 730 for processing, the information sent by the network device. In an uplink direction, the signal processing part 730 processes information of the terminal, and sends the information to the radio frequency part 720. The radio frequency part 720 processes the information of the terminal, and then sends the processed information to the network device by using the antenna 710.

The signal processing part 730 may include a modem subsystem, configured to process each communication protocol layer of data; and may further include a central processing subsystem, configured to process an operating system of the terminal and an application layer. In addition, the signal processing part 730 may further include other subsystems such as a multimedia subsystem and a peripheral subsystem. The multimedia subsystem is configured to control a camera of the terminal and display on a screen, and the peripheral subsystem is configured to implement a connection to another device. The modem subsystem may be an independently disposed chip. Optionally, the foregoing apparatus used for the terminal may be located in the modem subsystem.

The modem subsystem may include one or more processing elements 731, for example, including a main control CPU and another integrated circuit. In addition, the modem subsystem may further include a storage element 732 and an interface circuit 733. The storage element 732 is configured to store data and a program. However, a program used to perform the method performed by the terminal in the foregoing method may not be stored in the storage element 732, and is stored in a memory outside the modem subsystem and is loaded and used by the modem subsystem during use. Tire interface circuit 733 is configured to communicate with the other subsystems. The foregoing apparatus used for the terminal may be located in the modem subsystem. The modem subsystem may be implemented by using a chip. The chip includes at least one processing element and an interface circuit. The processing element is configured to perform the steps of any one of the foregoing methods performed by the terminal, and the interface circuit is configured to communicate with another apparatus.

In one implementation, units of the terminal that implement the steps in the foregoing method may be implemented by a processing element scheduling a program. For example, the apparatus used for the terminal includes a processing element and a storage element, and the processing element invokes a program stored in the storage element, to perform the method performed by the terminal in the foregoing method embodiment. The storage element may be a storage element located on a same chip as the processing element, namely, an on-chip storage element.

In another implementation, the program used to perform the method performed by the terminal in the foregoing method may be a storage element located on a different chip from the processing element, namely, an off-chip storage element. In this case, the processing element invokes or loads a program from the off-chip storage element on the on-chip storage element, to invoke and perform the method performed by the terminal in the foregoing method embodiment.

In still another implementation, units of the terminal that implement the steps in the foregoing method may be configured as one or more processing elements. The processing elements are disposed on the modem subsystem. The processing elements herein may be integrated circuits, for example, one or more application-specific integrated circuits (ASIC), or one or more digital signal processors (DSP), one or more field programmable gate arrays (FPGA), or a combination of these integrated circuits. These integrated circuits may be integrated together to form a chip.

The units of the terminal that implement the steps in the foregoing method may be integrated together, and are implemented in a form of a system-on-a-chip (SOC). The SOC chip is configured to implement the foregoing method. The at least one processing element and the storage element may be integrated into the chip, and the processing element invokes the program stored in the storage element, to implement the method performed by the foregoing terminal. Alternatively, at least one integrated circuit may be integrated into the chip, to implement the method performed by the foregoing terminal. Alternatively, with reference to the foregoing implementations, functions of some units may be implemented by a processing element invoking a program, and functions of some units may be implemented by an integrated circuit.

It may be learned that the foregoing apparatus used for the terminal may include the at least one processing element and the interface circuit, and the at least one processing element is configured to perform any one of the methods performed by the terminal provided in the foregoing method embodiment. The processing element may preform, in a first manner in winch the program stored in the storage element is invoked, some or all of the steps performed by the terminal, or may perform, in a second manner in which an integrated logic circuit of hardware in a processor element is combined with an instruction, some or all of the steps performed by the terminal. Certainly, some or all of the steps performed by the terminal may be alternatively performed by combining the first manner with the second manner.

The processing element herein is the same as the foregoing description, and may be a general purpose processor, for example, a central processing unit (CPU), or may be one or more integrated circuits configured to implement the foregoing method, for example, one or more ASICs, one or more microprocessors DSPs, one or more FPGAs, or a combination of at least two of these integrated circuits.

The storage element may be a memory, or may be a general term of a plurality of storage elements.

According to the method provided in the embodiments of this application, this application further provides a computer program product. The computer program product includes computer program code, and when the computer program code runs on a computer, the computer is enabled to perform the method in the foregoing embodiment.

According to the method provided in the embodiments of this application, this application further provides a computer readable medium. The computer readable medium stores program code, and when the program code runs on a computer, the computer is enabled to perform the method in the foregoing embodiment.

According to the method provided in the embodiments of this application, this application further provides a system, including the foregoing terminal.

All or some of the foregoing embodiments may be implemented by means of software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on the computer, the procedure or functions according to the embodiments of this application are all or partially generated. The computer may be a general-purpose computer, a special-purpose computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, infrared, radio, and microwave, or the like) manner. The computer storage medium may be any usable medium accessible by a computer, or a data storage device, such as a server or a data center, integrating one or more usable media. The usable medium may be a magnetic medium (for example, a, floppy disk, a hard disk, or a magnetic tape), an optical medium (for example, a, DVD), or a semiconductor medium. Tire semiconductor medium may be a solid-state drive.

Figure 9:
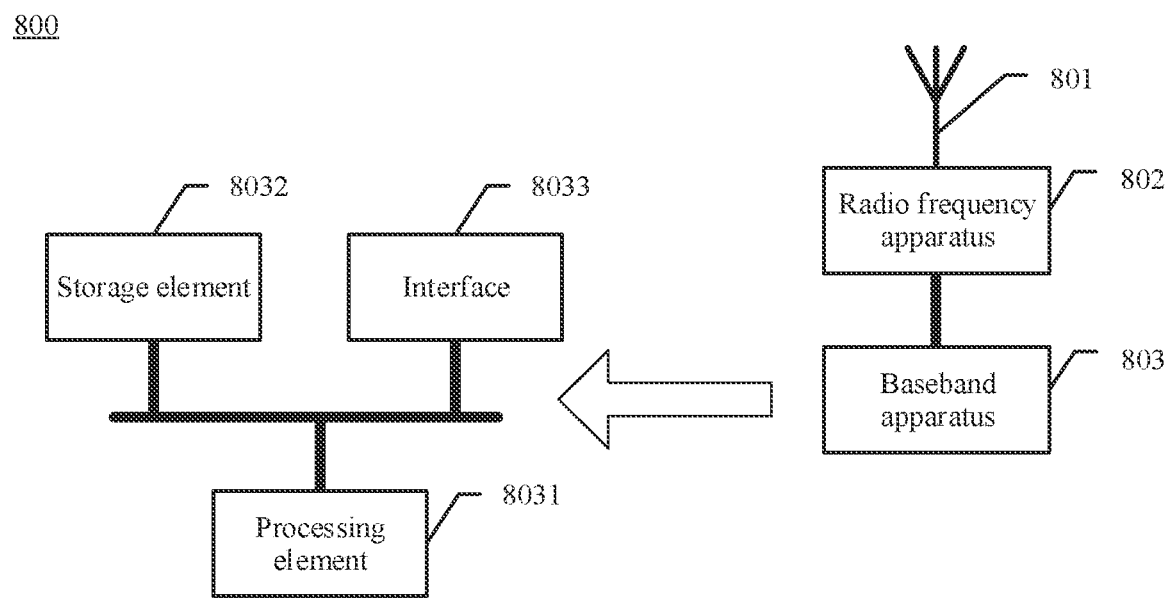
FIG. 9 is a schematic structural diagram of a network device according to an embodiment of this application.

FIG. 9 is a schematic structural diagram of a network device 800 according to an embodiment of this application. The network de vice 800 is configured to implement operations of the network device in the foregoing embodiment. As shown in FIG. 8, the network device includes an antenna 801, a radio frequency apparatus 802, and a baseband apparatus 803. The antenna 801 is connected to the radio frequency apparatus 802. In an uplink direction, the radio frequency apparatus 802 receives, by using the antenna 801, information sent by a terminal, and sends, to the baseband apparatus 803 for processing, the information sent by the terminal. In a downlink direction, the baseband apparatus 803 processes information of the terminal, and sends the information to the radio frequency apparatus 802. The radio frequency apparatus 802 processes the information of the terminal and then sends the processed information to the terminal by using the antenna 801.

The baseband apparatus 803 may include one or more processing elements 8031, for example, including a main control CPU and another integrated circuit. In addition, the baseband apparatus 803 may further include a storage element 8032 and an interface 8033, and the storage element 8032 is configured to store a program and data. The interface 8033 is configured to exchange information with the radio frequency apparatus 802. The interface is, for example, a common public radio interface (CPRI). The foregoing apparatus used for the network device may be located in the baseband apparatus 803. For example, the foregoing apparatus used for the network device may be a chip on the baseband apparatus 803. The chip includes at least one processing element and an interface circuit. The processing element is configured to perform the steps of any one of the foregoing methods performed by the network device, and the interface circuit is configured to communicate with another apparatus. In one implementation, units of the network device that implements the steps in the foregoing method may be implemented by a processing element scheduling a program. For example, the apparatus used for the network device includes a processing element and a storage element, and the processing element invokes a program stored in the storage element, to perform the method performed by the network device in the foregoing method embodiment. The storage element may be a storage element located on a same chip as the processing element, namely, an on-chip storage element, or may be a storage element located on a different chip from the processing element, namely, an off-chip storage element.

In another implementation, units of the network device that implement the steps in the foregoing method may be configured as one or more processing elements. The processing elements are disposed on the baseband apparatus. The processing elements herein may be integrated circuits, for example, one or more ASICs, one or more DSPs, or one or more FPGAs, or a combination of these integrated circuits. These integrated circuits may be integrated together to form a chip.

The units of the network device that implement the steps in the foregoing method may be integrated together, and are implemented in a form of a system-on-a-chip (SOC). For example, the baseband apparatus includes the SOC chip, configured to implement the foregoing method. The at least one processing element and the storage element may be integrated into the chip, and the processing element invokes the program stored in the storage element, to implement the method performed by the network device. Alternatively, at least one integrated circuit may be integrated into the chip, to implement the method performed by the foregoing network device. Alternatively, with reference to the foregoing implementations, functions of some units may be implemented by a processing element invoking a program, and functions of some units may be implemented by an integrated circuit.

It may be learned that the foregoing apparatus used for the network device may include the at least one processing element and the interface circuit, and the at least one processing element is configured to perform any one of the methods performed by the network device provided in the foregoing method embodiment. The processing element may perform, in a first manner in which the program stored in the storage element is invoked, some or all of the steps performed by the network device, or may perform, in a second manner in which an integrated logic circuit of hardware in a processor element is combined with an instruction, some or all of the steps performed by the network device. Certainly, some or all of the steps performed by the network device may be alternatively performed by combining the first manner with the second manner.

The processing element herein is the same as the foregoing description, and may be a general purpose processor, for example, a CPU, or may be one or more integrated circuits configured to implement the foregoing method, for example, one or more ASICs, one or more microprocessors DSPs, one or more FPGAs, or a combination of at least two of these integrated circuits.

The storage element may be a memory, or may be a general term of a plurality of storage elements.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The rants described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, wherein the method is performed by a terminal device and comprises:
    receiving timing advance timer (TAT) configuration information in a connection release message from a network device, wherein the TAT configuration information is used to configure duration of a TAT, wherein the TAT configuration information comprises a first TAT, and wherein the first TAT is used to control an effective time of an uplink timing advance for synchronous sending;
    configuring the TAT based on the TAT configuration information; and
    asynchronously sending uplink data based on a running status of the TAT, wherein the synchronous sending comprises sending data and a sequence code together on a data resource, and asynchronously sending the uplink data comprises sending 2-step random access channel (RACH) and the uplink data.

2. The method according to claim 1, wherein asynchronously sending the uplink data based on the running status of the TAT comprises:
    asynchronously sending the uplink data when the first TAT expires.

3. The method according to claim 1, wherein the TAT configuration information further comprises resource information used to synchronously send the uplink data.

4. The method according to claim 1, wherein the TAT configuration information comprises a second TAT, and wherein the second TAT is used to control an effective time of an uplink timing advance for asynchronous sending.

5. The method according to claim 4, wherein asynchronously sending the uplink data based on the running status of the TAT comprises:
    asynchronously sending the uplink data when the second TAT runs.

6. The method according to claim 1, wherein the method further comprises:
    when a maximum timing advance (TA) difference of the terminal device is greater than or equal to a first threshold and is less than or equal to a second threshold, determining that a TAT of a timing advance group (TAG) in which a secondary cell is located expires, and asynchronously sending the uplink data to the secondary cell, wherein the maximum TA difference is a maximum difference between TAs of any two of TAGs of the terminal device; or
    when a maximum TA difference of the terminal device is greater than a third threshold, determining that a TAT of a TAG in which a secondary cell is located expires, and asynchronously sending the uplink data to the secondary cell, wherein the maximum TA difference is a maximum difference between TAs of any two of TAGs of the terminal device.

7. An apparatus comprising:
a memory; and
one or more processors coupled to the memory, wherein the one or more processors are configured to:
    receive timing advance timer (TAT) configuration information in a connection release message from a network device, wherein the TAT configuration information is used to configure duration of a TAT, wherein the TAT configuration information comprises a first TAT, and wherein the first TAT is used to control an effective time of an uplink timing advance for synchronous sending;
    configure the TAT based on the TAT configuration information; and
    asynchronously send uplink data based on a running status of the TAT, wherein the synchronous sending comprises sending data and a sequence code together on a data resource, and asynchronously sending the uplink data comprises sending 2-step random access channel (RACH) and the uplink data.

8. The apparatus according to claim 7, wherein asynchronously sending the uplink data based on the running status of the TAT comprises:
    asynchronously sending the uplink data when the first TAT expires.

9. The apparatus according to claim 7, wherein the TAT configuration information further comprises resource information used to synchronously send the uplink data.

10. The apparatus according to claim 7, wherein the TAT configuration information comprises a second TAT, and wherein the second TAT is used to control an effective time of an uplink timing advance for asynchronous sending.

11. The apparatus according to claim 10, wherein asynchronously sending the uplink data based on the running status of the TAT comprises:
    asynchronously sending the uplink data when the second TAT runs.

12. The apparatus according to claim 7, wherein the one or more processors are configured to:
    when a maximum timing advance (TA) difference of the apparatus is greater than or equal to a first threshold and is less than or equal to a second threshold, determine that a TAT of a timing advance group (TAG) in which a secondary cell is located expires, and asynchronously sending the uplink data to the secondary cell, wherein the maximum TA difference is a maximum difference between TAs of any two of TAGs of the apparatus; or
    when a maximum TA difference of the apparatus is greater than a third threshold, determine that a TAT of a TAG in which a secondary cell is located expires, and asynchronously sending the uplink data to the secondary cell, wherein the maximum TA difference is a maximum difference between TAs of any two of TAGs of the apparatus.

13. An apparatus comprising:
a memory; and
one or more processors coupled to the memory, wherein the one or more processors are configured to:
    send timing advance timer (TAT) configuration information in a connection release message to a terminal device, wherein the TAT configuration information is used by the terminal device to configure duration of a TAT, wherein the TAT configuration information further comprises a first TAT, and wherein the first TAT is used to control an effective time of an uplink timing advance for synchronous sending; and
    receive uplink data sent by the terminal device based on a running status of the TAT, wherein the synchronous sending comprises sending data and a sequence code together on a data resource, and receiving the uplink data comprises receiving 2-step random access channel (RACH) and the uplink data.

14. The apparatus according to claim 13, wherein the TAT configuration information further comprises a resource used to synchronously send the uplink data.

* * * * *